United States Patent [19]
Nishibori et al.

[11] Patent Number: 5,984,750
[45] Date of Patent: *Nov. 16, 1999

[54] METHOD OF SEALING HALOGEN LAMP

[76] Inventors: Yumiko Nishibori; Mari Nishibori, both of 3-4, Meguro 1-chome, Meguro-ku, Tokyo, 153, Japan

[*] Notice: This patent is subject to a terminal disclaimer.

[21] Appl. No.: 08/857,003

[22] Filed: May 15, 1997

[30] Foreign Application Priority Data

May 24, 1996 [JP] Japan .................................. 8-153212

[51] Int. Cl.[6] .................................................. H01J 27/00
[52] U.S. Cl. ................................................ 445/27; 445/26
[58] Field of Search ........................................ 445/26, 27

[56] References Cited

U.S. PATENT DOCUMENTS

| | | | |
|---|---|---|---|
| 5,008,592 | 4/1991 | Pragt | 313/623 |
| 5,108,333 | 4/1992 | Heider et al. | 445/26 |
| 5,209,689 | 5/1993 | Griffin et al. | 445/27 |

OTHER PUBLICATIONS

U.S. application Ser. No. 08/857,003, filed May 15, 1997, pending.
U.S. application Ser. No. 08/923,541, filed Sep. 4, 1997, pending.

Primary Examiner—Kenneth J. Ramsey
Assistant Examiner—Gene H. Rhodes
Attorney, Agent, or Firm—Oblon, Spivak, McClelland, Maier & Neustadt, P.C.

[57] ABSTRACT

A method of sealing a halogen lamp including: providing a lamp envelop having an envelop body, an open end portion and a closed end portion: inserting a mount including a filament into the lamp envelop through the open end portion thereof; heating the closed end portion of the lamp envelop to soften and shrink thereby sealingly embedding one end of the mount in the closed end portion of the lamp envelop, while providing a reduced pressure in the lamp envelop; filling the lamp envelop with a required gas; and heating the open end portion of the lamp envelop to soften and shrink thereby sealingly embedding the other end of the mount in the closed end portion of the lamp envelop.

10 Claims, 23 Drawing Sheets

METHOD OF SEALING HALOGEN LAMP

BACKGROUND OF THE INVENTION

1. Field of the Invention

The present invention relates to a method of sealing halogen lamp without using a tip tube.

2. Description of the Prior Art

FIG. 23 shows a conventional halogen lamp (B') having a typical configuration wherein sealing foils (10') are respectively embedded in seal portions (13') of a lamp envelop (1'), and the inner end of each sealing foil (10') is welded to a lead portion of a filament, while the outer end thereof is welded to a corresponding outer lead pin (11') extending to project outwardly from the seal portion (13').

It has been a conventional practice to seal this type of halogen lamps in the following manner. As shown in FIG. 22, an inert gas such as nitrogen or argon is supplied through a gas supply tube (20') connected to a tip tube (29') into the lamp envelop (1') and discharged from the opposite ends of the lamp envelop (1') to keep the inside of the envelop (1') in a non-oxidizing atmosphere. In this state, the opposite ends of the lamp envelop (1') are simultaneously or successively heated so as to be softened, and the end portions thus softened are pinch-sealed. Then, the gas within the lamp envelop (1') is sucked out through the tip tube (29') connected to the lamp envelop (1') to provide a high vacuum in the lamp envelop (1'). In turn, a required gas is filled into the lamp envelop (1'), and finally the tip tube (29') is cut-sealed at the base portion thereof by heating.

In this method, the inert gas is supplied into the lamp envelop (1') to retain the sealing foils (10') as well as the lamp envelop (1') in the non-oxidizing atmosphere so that the pinch-sealing can be achieved without oxidization of the surfaces of the sealing foils (10'). However, air sometimes enters the lamp envelop (1') instantaneously from the open ends thereof depending on the position of a burner or the intensity of flame, thereby causing the surface of the sealing foils (10') to be slightly oxidized. This results in poor adhesion between the lamp envelop (1') and the sealing foil (10') in the seal portions (13'), which leads to a high possibility of leak accidents of the product. Where a large amount of air enters the lamp envelop (1'), the surfaces of the sealing foil (10') are intensely oxidized and may be broken into fragments during the pinch-sealing. Further, where the outer lead pin (11') has a relatively small diameter, it may be burned out.

Further, even if the sealing foils (10') are not in an oxidized condition, the sealing foils (10') may be broken when applied with an increased pinching force greater than the breaking force in an attempt to enhance the adhesion between the seal portions (13') and the sealing foils (10'). Therefore, the relationship between the softening of the lamp envelop (1') and the pinching force is very delicate.

Furthermore, when the inert gas is supplied into the lamp envelop (1'), the gas flow causes the sealing foils (10') to flutter, hence, the position thereof to vary. Therefore, it is very difficult to pinch the lamp envelop (1') with the sealing foils (10') kept in predetermined positions within the seal portions (13'). Thus, a separate device is required for keeping the sealing foils (10') stationary.

Still further, the use of tip tube (29') results in a cut-sealed trace (30') of the tip tube (29') formed on a side surface of the lamp envelop, which not only renders the appearance of the lamp poor but also causes an internal strain to be left in peripheral portions thereof, decreasing the pressure resistance of the lamp envelop (1'). Repeating on/off operations of the lamp i.e., repeating heating and cooling of the lamp may eventually causes the lamp envelop to be broken from the cut-sealed trace (30').

Recently, halogen lamps adaptable for commercial voltages of less power consumption in many countries have been demanded. In response thereto, the volume of a lamp envelop can not help being decreased. However, if a tip tube is used in such a lamp envelop of a decreased volume, the lamp envelop can not be sufficiently cooled when it is immersed in liquid nitrogen for cutting the tip tube after a required gas is filled therein, because liquid nitrogen vaporizes due to the heat of a tip-off burner. As a result, the amount of the filling gas becomes insufficient and, hence, sufficient pressurizing of the lamp envelop can not be achieved. Thus, in spite of the recent tendency to increase the pressure of the gas to be filled in the lamp envelop so as to enhance the performance of the lamp such as a brightness and lifetime, the use of a tip tube makes it impossible to increase the filling gas pressure for such a small volume lamp envelop because of the reasons stated above. Further, the presence of the cut-sealed trace of the tip tube causes an internal strain to be left adjacent the trace and, hence, the lamp envelop can not endure such a high filling gas pressure. Consequently, it has been difficult to significantly enhance the performance of a small-sized halogen lamp of the type using a tip tube.

There exists another problem that the cut-sealed trace of the tip tube causes the scattering of light passing through the trace and the peripheral portion thereof, which leads to a decreased light-converging ability. Such a lamp is not suitable for use as a light source of high-precision apparatus such as a microscope or a measuring instrument.

It is, therefore, an object of the present invention to provide a novel method of sealing a halogen lamp, with which: the sealing foils are unlikely to be oxidized or broken; the outer lead pins are unlikely to burn out; a conventionally required tip tube can be dispensed with thereby providing a lamp envelop free of the cut-sealed trace; and the filling gas pressure can be increased.

SUMMARY OF THE INVENTION

In accordance with a first aspect of the present invention, there is provided a method of sealing a halogen lamp comprising the steps of: providing a lamp envelop having an envelop body, an open end portion and a closed end portion; inserting a mount including a filament into the lamp envelop through the open end portion thereof; heating the closed end portion of the lamp envelop to soften and shrink thereby sealingly embedding one end of the mount in the closed end portion of the lamp envelop, while providing a reduced pressure in the lamp envelop: filling the lamp envelop with a required gas: and heating the open end portion of the lamp envelop to soften and shrink thereby sealingly embedding the other end of the mount in the closed end portion of the lamp envelop.

With this method, the closed end portion of the lamp envelop is heated to shrink under a reduced pressure. Accordingly, where sealing foils are used in the mount, they can be assuredly embedded in the sealed portions thus shrunk without receiving any excessive force, hence, without any danger of breaking.

Further, since the lamp envelop is completely closed on the closed end side, air does not enter from the outside into the lamp envelop through the closed end side and, hence, oxidization of the sealing foil or burning-out of an outer lead pin can be avoided on the closed end side. Furthermore, since the sealing foils do not flatter by the flow of an inert gas, one end of the mount can be securely embedded in a central portion of the shrunk closed end portion of the lamp envelop.

The closed end portion in the softened state may be pinched with an appropriate force for shaping. Similarly, the sealing/embedding operation on the open end side may be carried out by pinching.

With this method, since the heating/shrinking operation is carried out under a reduced pressure, good adhesion can be provided between one end of the mount and the shrunk portion of the lamp envelop. Further, the sealing foil attached to one end of the mount will not be broken because a conventional forcible pinch-sealing process is not employed in this method.

It should be noted that an unnecessary portion of at least the closed end portion of the lamp envelop is cut away to expose a portion of the mount.

The closed end portion may be formed to have the same width as that of the envelop body as shown in FIG. 11, or formed narrower than the envelop body as shown in FIG. 12, or may comprise a narrower portion to be heated and softened and the rest having the same width as that of the envelop body as shown in FIG. 13. Alternatively, it is conceivable that the closed end portion be formed by inserting a sealing plug into an open end of the lamp envelop as shown in FIG. 4.

The open end portion may be formed narrower than the envelop body as shown in FIGS. 8 and 15, or formed to have the same width as that of the envelop body as shown in FIG. 14, or may comprise a narrower portion to be heated and softened and the rest having the same width as that of the envelop body as shown in FIG. 9.

In accordance with a second aspect of the present invention, there is provided a method of sealing a halogen lamp comprising the steps of: providing a lamp envelop having an envelop body, and first and second end portions which are open; inserting a mount including a filament into the lamp envelop and closing the first end portion, or closing the first end portion and inserting the mount into the lamp envelop; heating the first end portion thus closed of the lamp envelop to soften and shrink thereby sealingly embedding one end of the mount in the closed first end portion of the lamp envelop, while providing a reduced pressure in the lamp envelop: filling the lamp envelop with a required gas: and heating the second end portion of the lamp envelop to soften and shrink thereby sealingly embedding the other end of the mount in the closed second end portion of the lamp envelop.

In this method, the lamp envelop having open opposite end portions is used one of which ends is to be closed with a sealing plug formed of, for example, silicone rubber after or before the insertion of the mount into the lamp envelop. The sealing plug is not limited to such an insertion type formed of silicone rubber but may be of a cap type to be fitted over the end portion of the lamp envelop through an O-ring.

After having sealed one end of the lamp envelop in this way, the subsequent steps which are the same as those of the first method are carried out to make a halogen lamp. In this case, the lamp may be used without cutting unnecessary portions of the opposite end portions of the lamp envelop.

Where the sealing plug is used, it should be sufficiently spaced from the portion of the lamp envelop to be heated and softened, or should be cooled to avoid burning during the heating.

In practice, however, the sealing plug will not actually be burnt because the filling gas thus heated convects in a reduced pressure. Also, where the lamp envelop is formed of quartz glass, the sealing plug will not be burnt due to the heat of the burner flame because quartz glass has a small thermal conductivity.

Preferably, only the closed end portion or both the closed end portion and the open end portion are made narrower than the envelop body, and the mount is inserted into the lamp envelop in such a manner that opposite ends of the mount are positioned in the open end portion and the closed end portion, respectively, of the lamp envelop.

In this way, the opposite ends of the mount are respectively positioned in the open end portion and the closed end portion at least one of which is narrower than the envelop body, whereby the mount is easily aligned on the central axis of the lamp envelop by mere insertion. In this case, it is preferable to attach a resilient suspension member to the end of the mount to be positioned in the open end portion of the lamp envelop so as to position such end centrally of the corresponding end portion of the lamp envelop. The provision of the resilient suspension member allows the centering of the mount to be further facilitated.

In the method of to the present invention, it is desired that the open end portion of the lamp envelop comprises a narrow portion which is equal to or smaller in width than the envelop body, and a wide portion which is wider than the narrow portion, the narrow portion being intended to be heated to form a seal portion.

In this way, when the narrow portion is heated for sealing the open end portion, the existence of the wide portion hinders flame of the burner from reaching a gas supply tube, and thus, the gas supply tube can be protected by the wide portion. As a result, the distance between the lower end of the gas supply tube and the upper end of the envelop body can be shortened, which lead to a decreased cost of making a lamp.

The mount preferably has a resilient suspension member at any portion thereof, the resilient suspension member resiliently engaging any portion of the lamp envelop when inserted into the lamp envelop.

The functions of the resilient suspension member are as follows. Firstly, the resilient suspension member suspends the mount at a desired position within the lamp envelop to facilitate the axial positioning of the mount relative to the lamp envelop. Secondly, the resilient suspension member prevents the mount from axially shifting during the sealing of the closed end portion and the open end portion. Thirdly, where the end portion opposite the end portion engaged with the resilient suspension member is formed narrow, the resilient suspension member in cooperation with the narrow end portion (which may be open or closed) facilitates the centering of the mount relative to the lamp envelop.

The resilient suspension member may be formed into various shapes as will be described later, and an optimal one may be selected as required.

Preferably, the step of heating the closed end portion of the lamp envelop further includes pinch-sealing a heated and softened portion of the closed end portion.

Further, the step of heating the open end portion of the lamp envelop preferably further includes pinch-sealing a heated and softened portion of the open end portion.

In this way, the pinching operation in cooperation with the shrinking of each end portion enhances the adhesion between the sealing foils and the corresponding seal portions of the lamp envelop. As a result, the filling gas pressure within the lamp envelop can be increased, which leads to enhanced performance of the resulting lamp as well as to good appearance of the finished seal portions.

These and other objects, features and attendant advantages will become readily apparent from the reading of the following detailed description of the invention in conjunction with the attached drawings.

DETAILED DESCRIPTION OF THE PREFERRED EMBODIMENTS

The present invention will now be described in detail with reference to the accompanying drawings.

Figure 3:
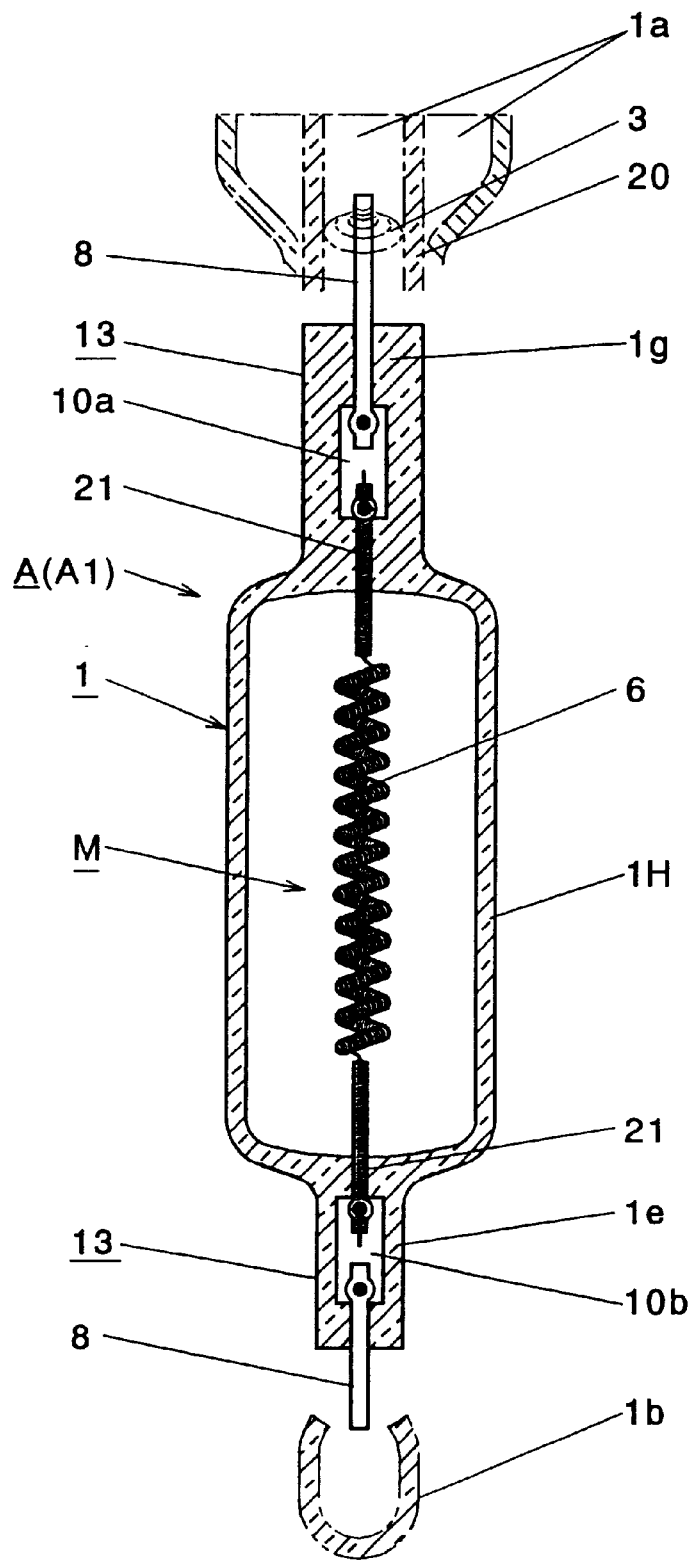
FIG. 3 is a partially-sectional elevational view illustrating a first embodiment of a double-ended type halogen lamp according to the present invention in a state where opposite ends of the lamp envelop are sealed.

Referring to FIG. 3, a halogen lamp (A1) in accordance with a first embodiment of the present invention is of a double-ended type having seal portions 13 comprising a shrunk portion 1e and a sealed portion 1g formed at opposite ends of a lamp envelop 1, and a filament 6 extending in a envelop body 1H. The filament 6 is of a double coil type of tungsten including at opposite ends thereof, lead portions 21 formed by covering a single coil by another coil, and the outer end of each lead portion 21 is welded to the inner end of each sealing foil 10. At least one support member (not shown) in the form of a vortex may be disposed to wind around an appropriate portion of the filament 6 so that a portion of the outer circumference of the vortex is fixedly embedded in a support fixing portion of the lamp envelop 1 formed by concavely denting the lamp envelop 1.

The configuration of each lead portion 21 is not limited to that described above. That is, the lead portion 21 may comprise a single coil portion of the filament 6 directly welded to the sealing foil 10, or connected to the sealing foil 10 through an inner lead pin (not shown).

The sealing foils 10a and 10b are each typically formed of thin molybdenum foil having a thickness of from 20 to 30 μm. At least a portion of each sealing foil is embedded in each seal portion 13, and the outer end of each sealing foil is welded to an outer lead pin 8 extending outwardly to project from the corresponding seal portion 13. The sealing foils 10a and 10b may be disposed to extend outwardly from the respective seal portions 13, and in that case, the outer lead pins 8 can be dispensed with.

A first form of mount M in accordance with the present invention comprises filament 6, lead portions 21 connected to opposite ends of the filament 6 directly or through inner lead pins, sealing foils 10a and 10b respectively welded to the outer ends of the lead portions 21, and outer lead pins 8 respectively welded to the outer ends of the sealing foils 10a and 10b.

A second form of mount M is of a sealing foil free type wherein opposite ends of filament 6 are respectively connected to outer lead pins 8 directly or through lead portions 21.

Figure 7:
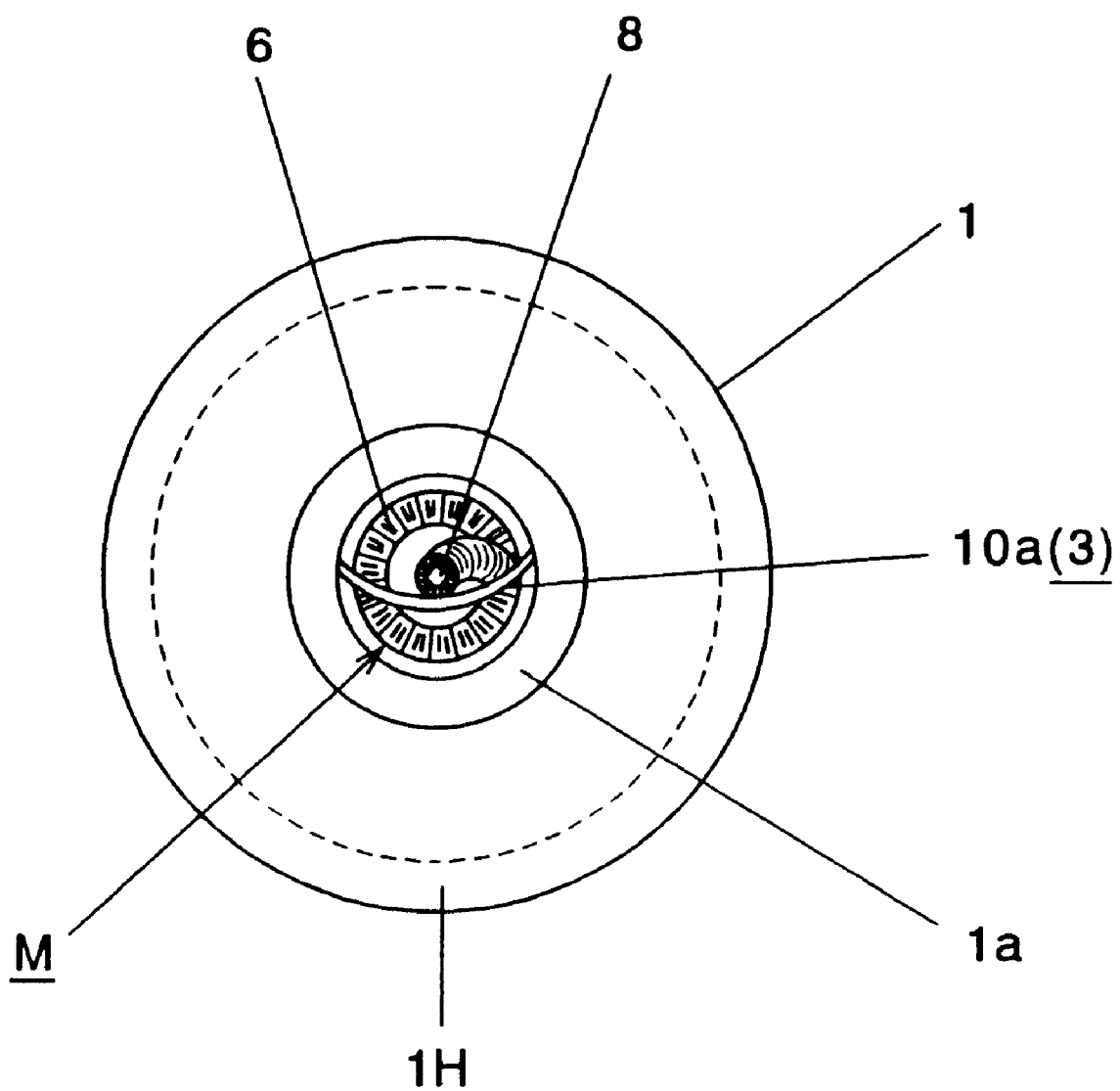
FIG. 7 is a plan view illustrating one step of a method according to the present invention in which a sealing foil serves as a resilient suspension member.
Figure 8:
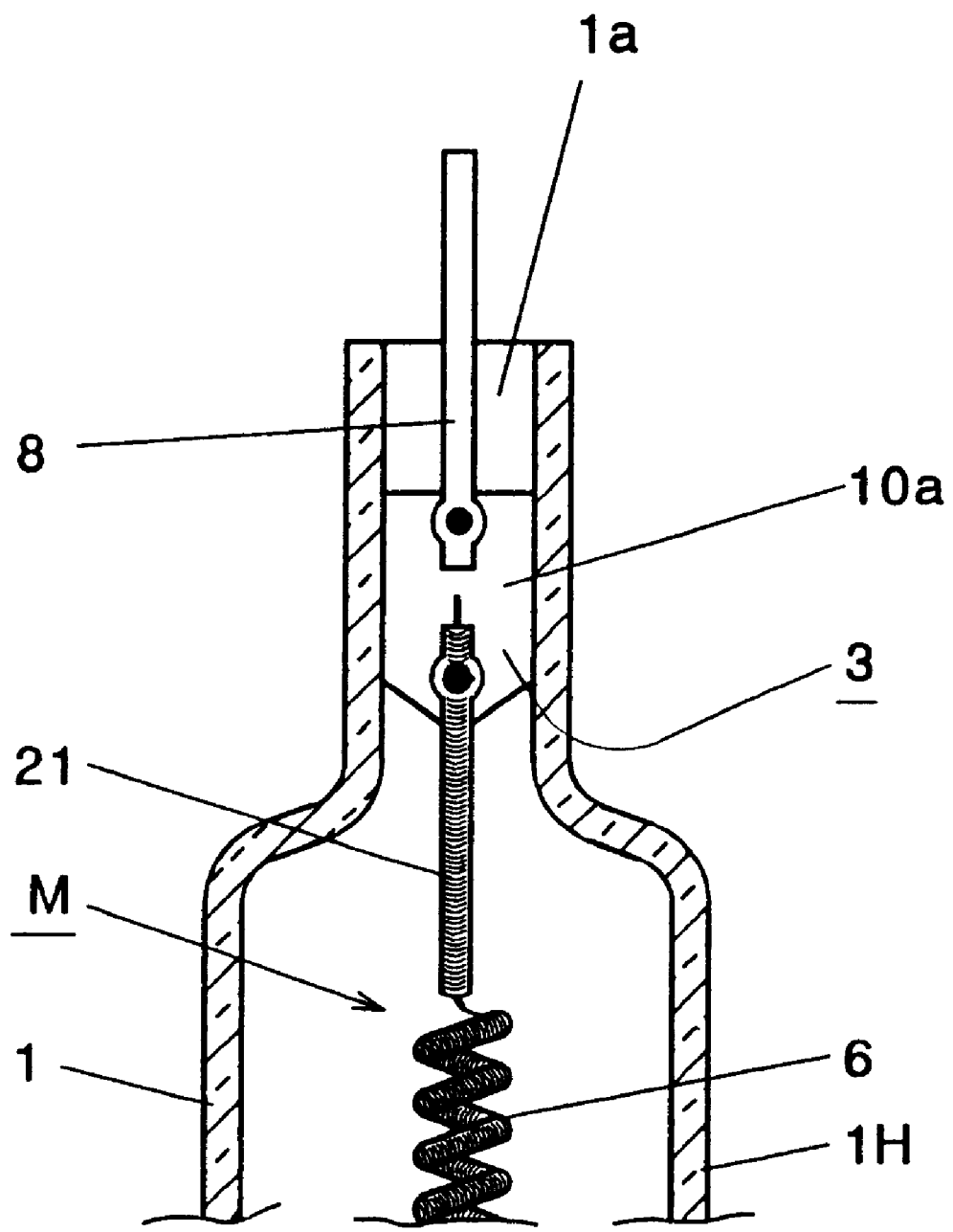
FIG. 8 is a partially-sectional fragmentary elevational view of FIG. 7.

In either form of mount M, a separate resilient suspension member 3 is usually attached to one of the outer lead pins 8. Exceptionally, where the sealing foil 10a has a width larger than the inside width of an open end portion 1a of the lamp envelop 1, the sealing foil 10a serves as a resilient suspension member by resiliently engaging at the opposite edges thereof with the inner surface of the open end portion 1a of the lamp envelop 1 as shown in FIGS. 7 and 8. In this construction, which is suitable for a lighter mount, the provision of the separate resilient suspension member 3 is not required, and hence it is possible to decrease the manufacturing cost and weight of a lamp. In another exception, a portion of outer lead pin 8 is bent to serve as the resilient suspension member 3, which also leads to a decreased manufacturing cost and weight of a lamp. In addition to the resilient suspension member described above, any other means for suspending mount M may be employed.

Figure 9:
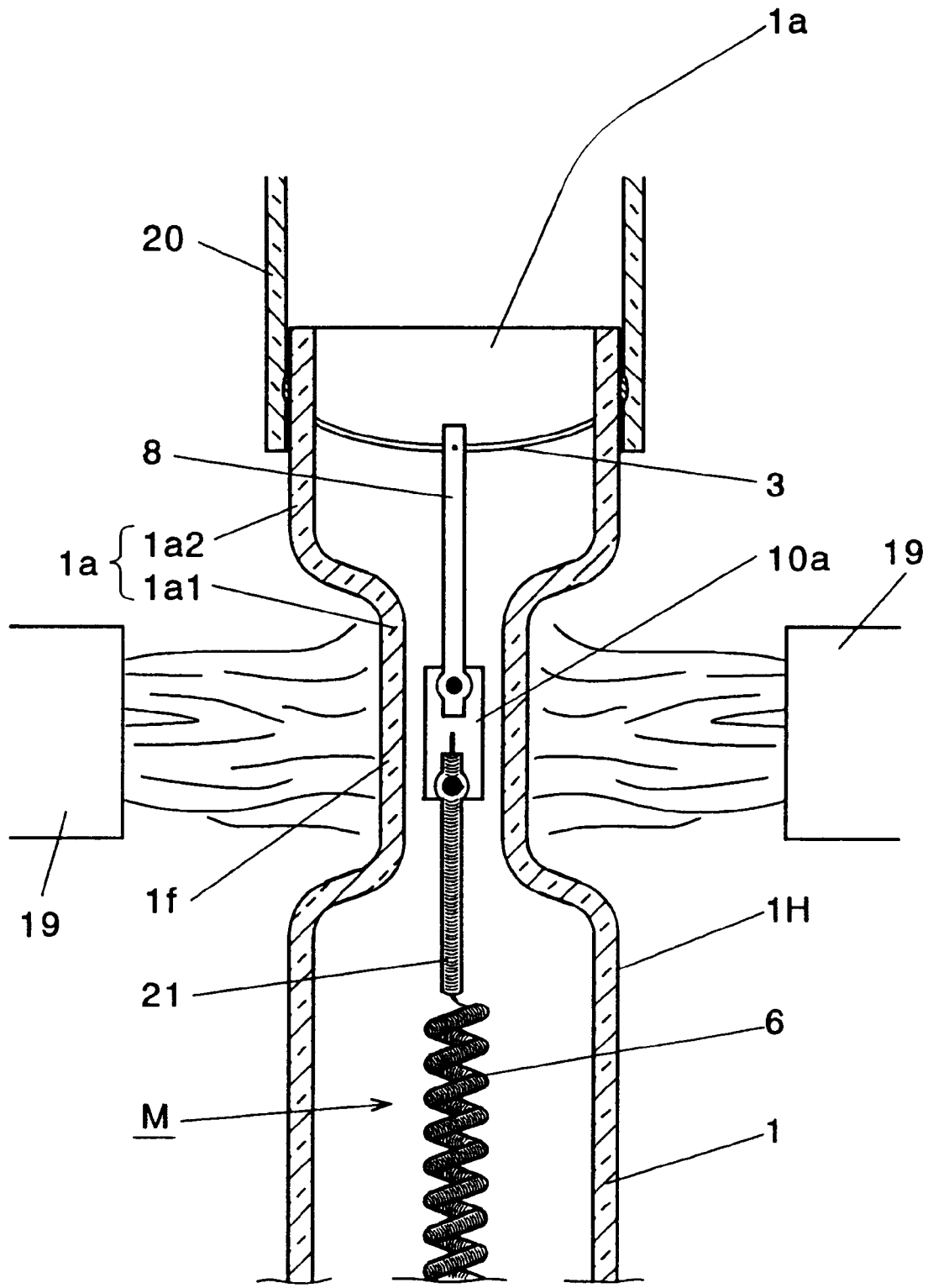
FIG. 9 is a partially-sectional fragmentary elevational view illustrating one step of a method according to the present invention in which a lamp envelop has an open end portion comprising a wide portion and a narrow portion.
Figure 10:
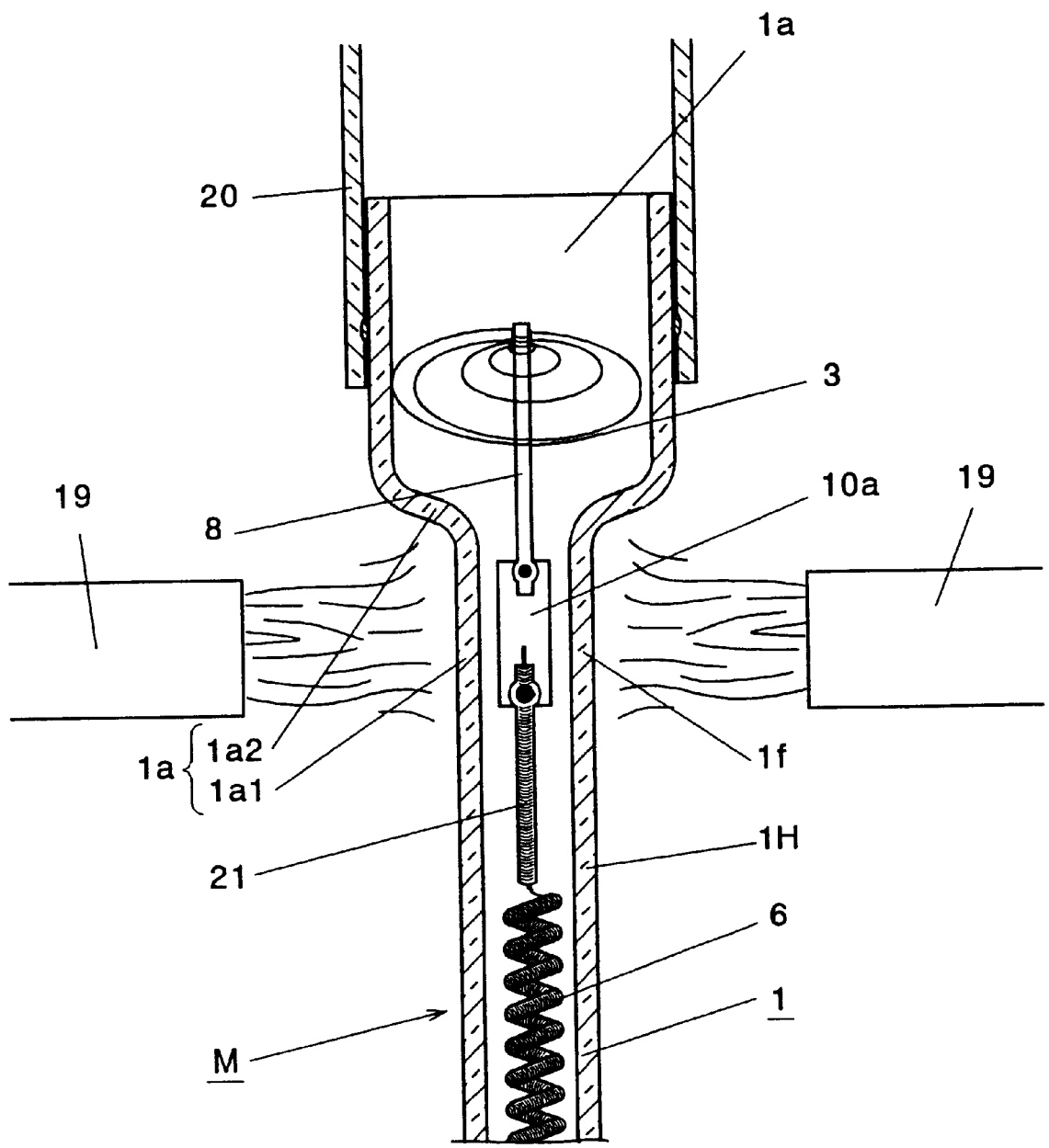
FIG. 10 is a partially-sectional fragmentary elevational view illustrating one step of a method according to the present invention in which a lamp envelop has an open end portion formed wider than the envelop body.
Figure 14:
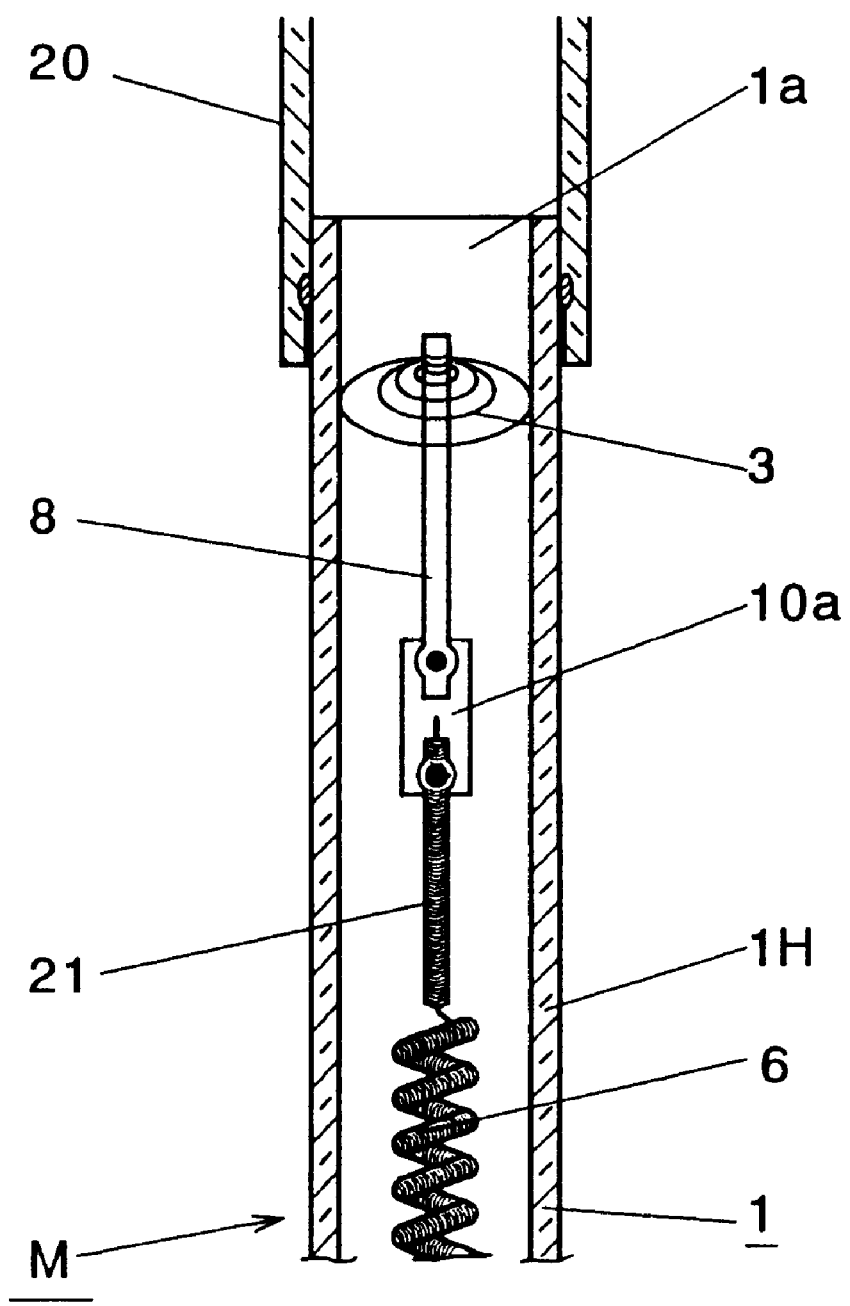
FIG. 14 is a partially-sectional fragmentary elevational view illustrating one step of a method according to the present invention in which a lamp envelop has an open end portion formed to have the same width as that of the envelop body.
Figure 15:
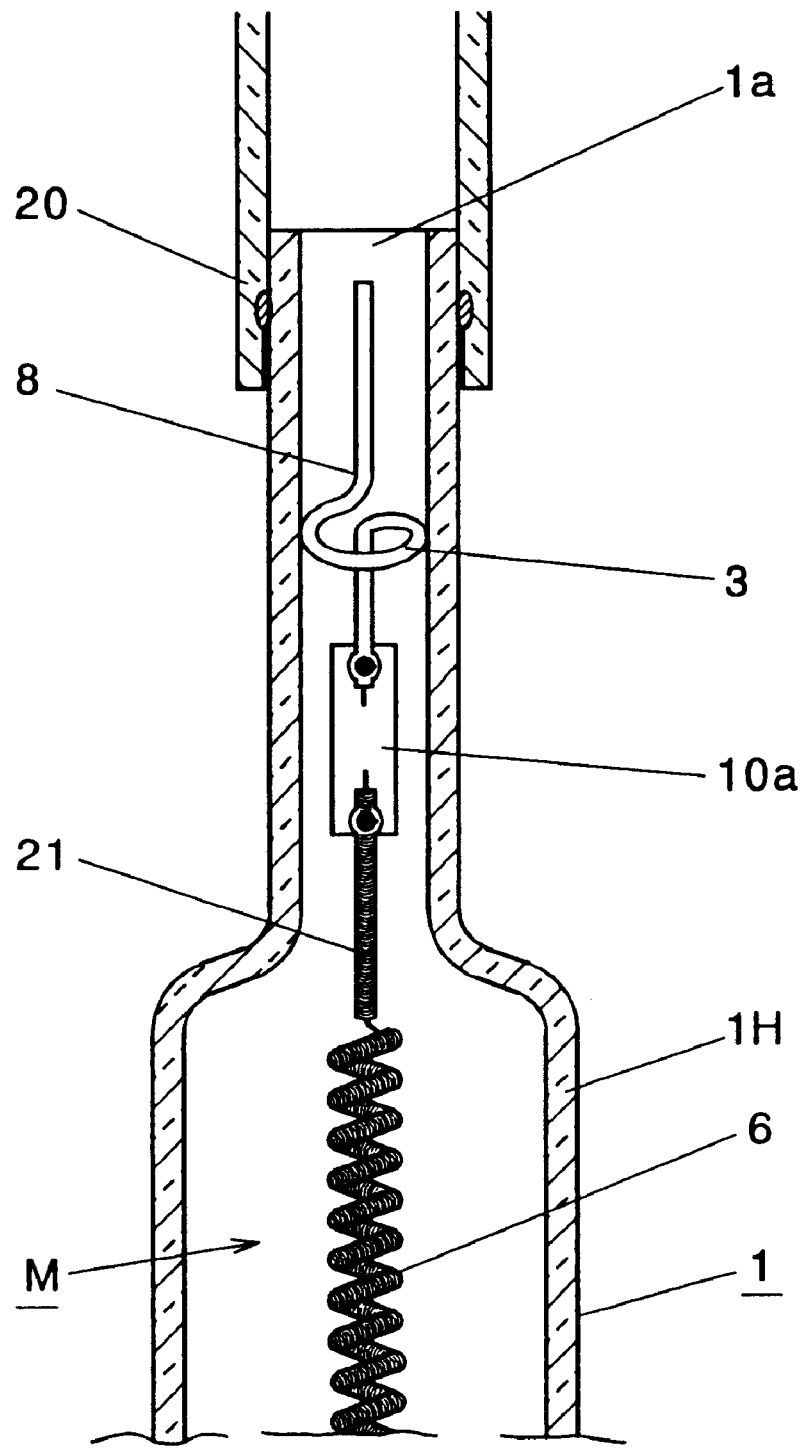
FIG. 15 is a partially-sectional fragmentary elevational view illustrating one step of a method according to the present invention in which a lamp envelop has an open end portion formed narrower than the envelop body, and a portion of an outer lead pin is bent to serve as a resilient suspension member.

The shape of lamp envelop 1 in accordance with the present invention is as follows. Open end portion 1a of lamp envelop 1 may be formed to have the same width as that of envelop body 1H as shown in FIG. 14, or formed narrower than envelop body 1H as shown in FIGS. 8 and 15. Alternatively, open end portion 1a may comprise a narrow portion 1a1 having a smaller width than that of envelop body 1H and a wide portion 1a2 contiguous to the narrow portion 1a1 as shown in FIG. 9. That is, only a portion 1f to be heated and softened may be formed narrower than envelop body 1H.

Figure 4:
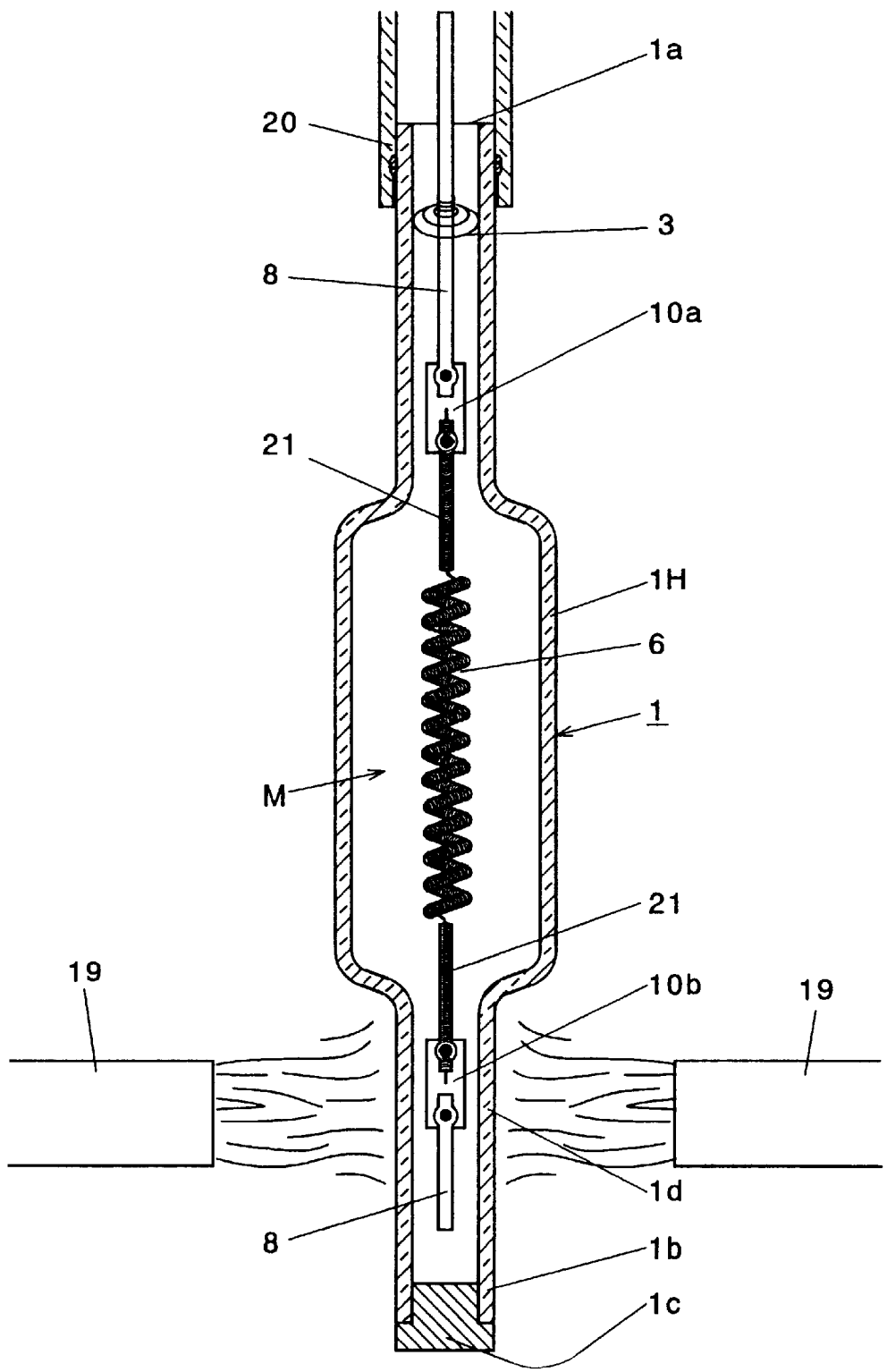
FIG. 4 is a partially-sectional elevational view illustrating one step of a method according to the present invention in which a lamp envelop having open opposite end portions is used and is in a state where one end thereof is closed with a sealing plug and heated.
Figure 11:
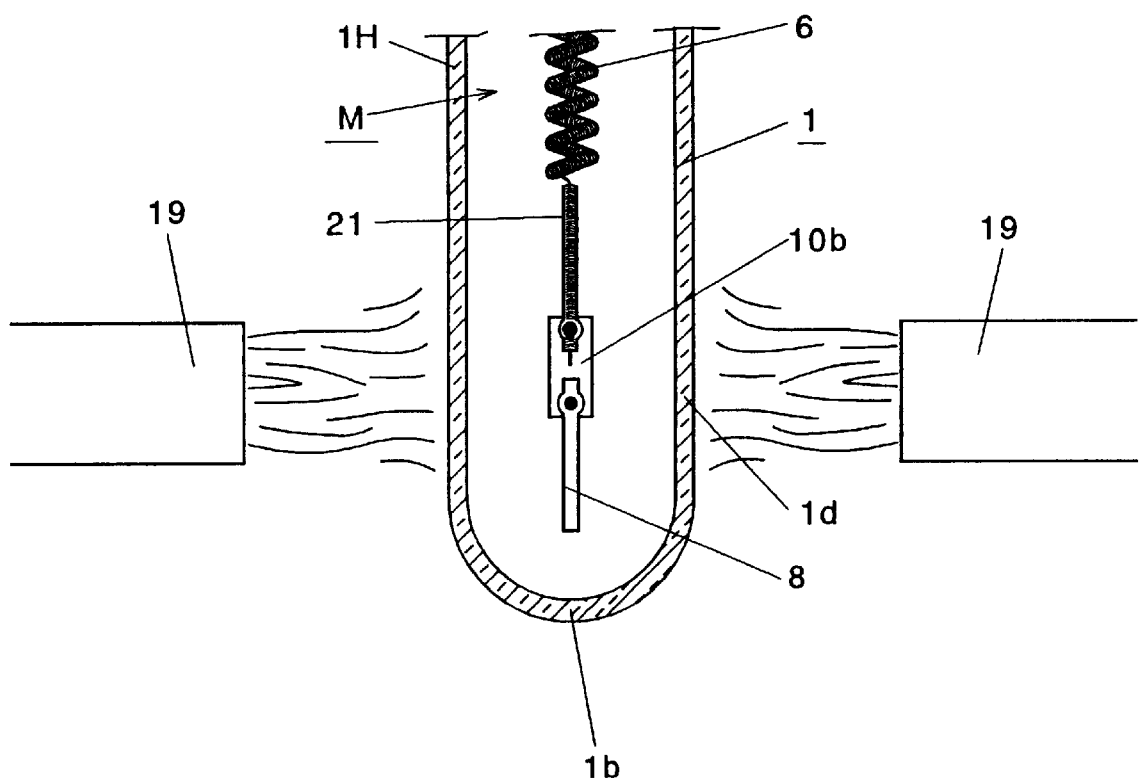
FIG. 11 is a partially-sectional fragmentary elevational view illustrating one step of a method according to the present invention in which a lamp envelop has a closed end portion formed to have the same width as that of the envelop body.
Figure 12:
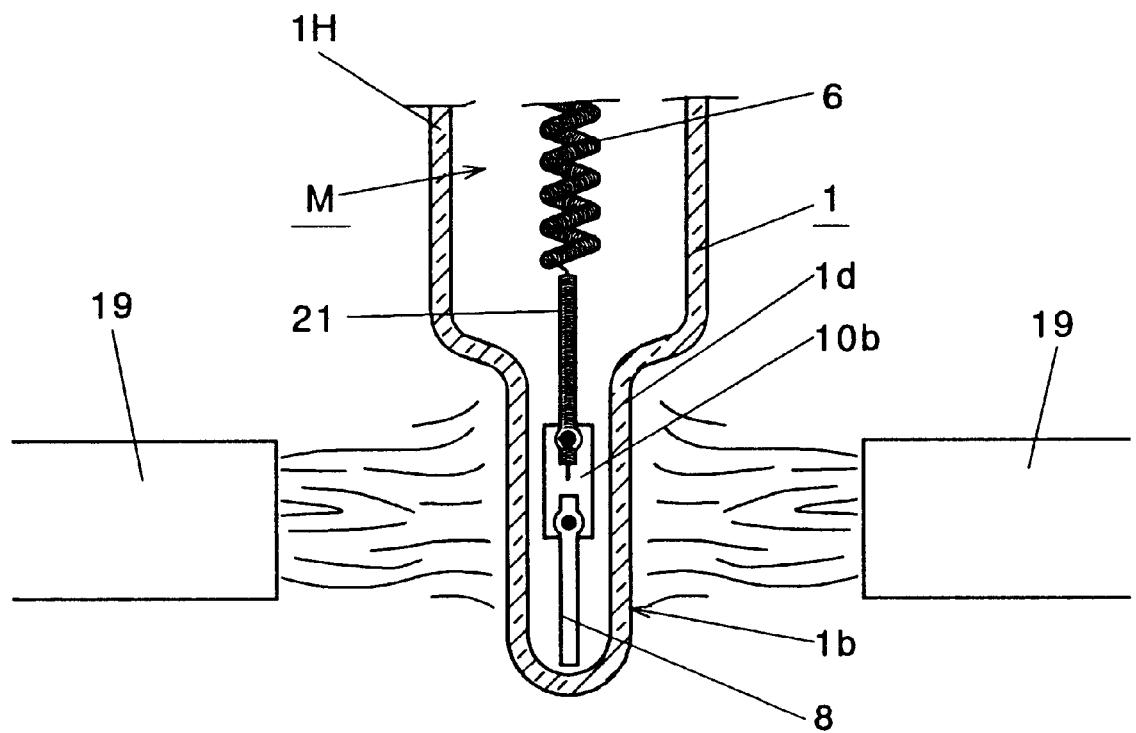
FIG. 12 is a partially-sectional fragmentary elevational view illustrating one step of a method according to the present invention in which a lamp envelop has a closed end portion formed narrower than the envelop body.
Figure 13:
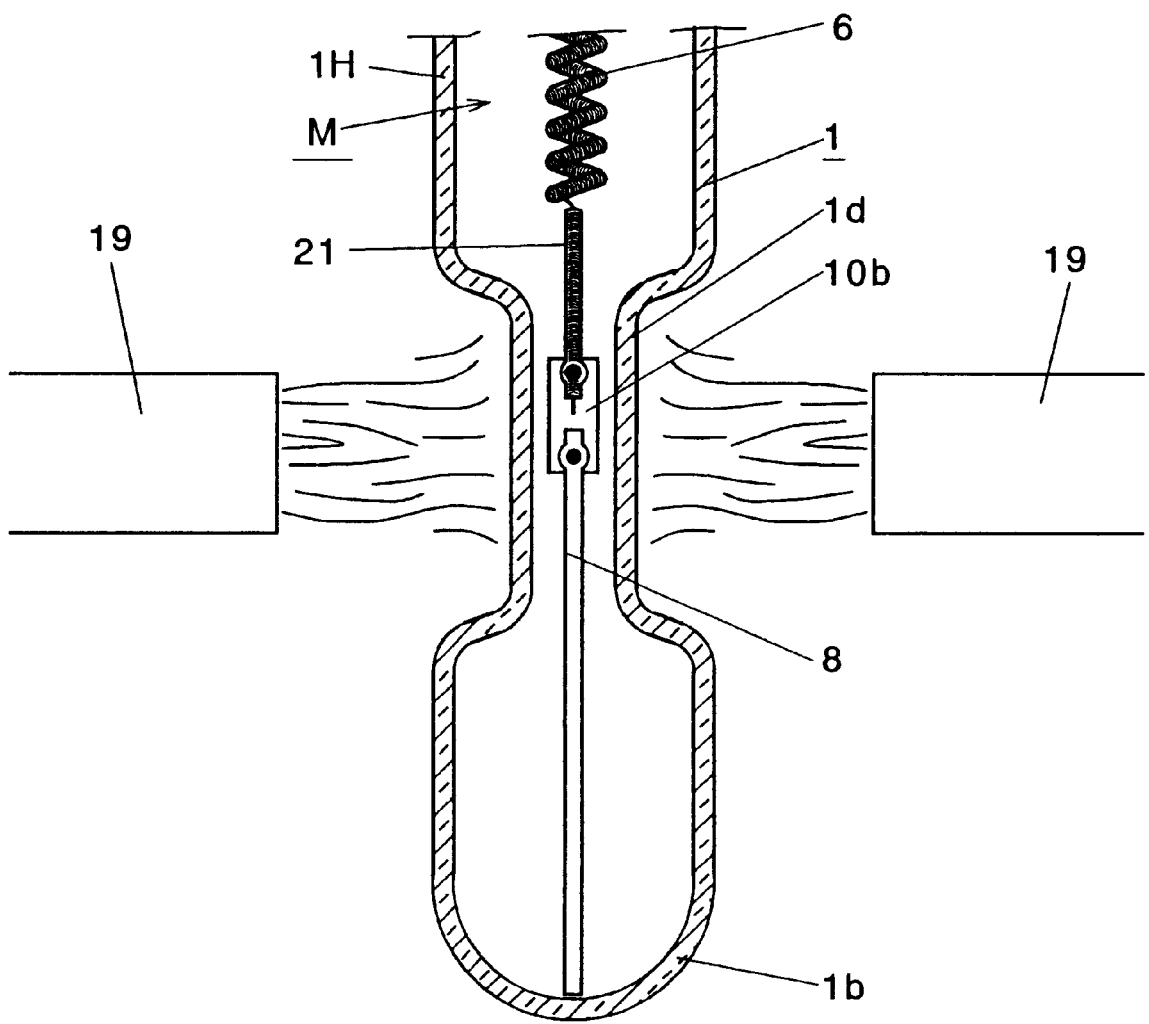
FIG. 13 is a partially-sectional fragmentary elevational view illustrating one step of a method according to the present invention in which a lamp envelop has a closed end portion partially formed narrower than the envelop body.

A closed end portion 1b of lamp envelop 1 may be formed to have the same width as that of envelop body 1H as shown in FIG. 11, or formed narrower than the envelop body 1H as shown in FIG. 12, or comprise a portion 1d to be heated and softened which is formed narrower and the rest as shown in FIG. 13. Closed end portion 1b may be formed by fitting a sealing plug 1c into an open end as shown in FIG. 4.

It should be noted that any combination of the forms of open end portion 1a and closed end portion 1b can be employed.

Figure 1:
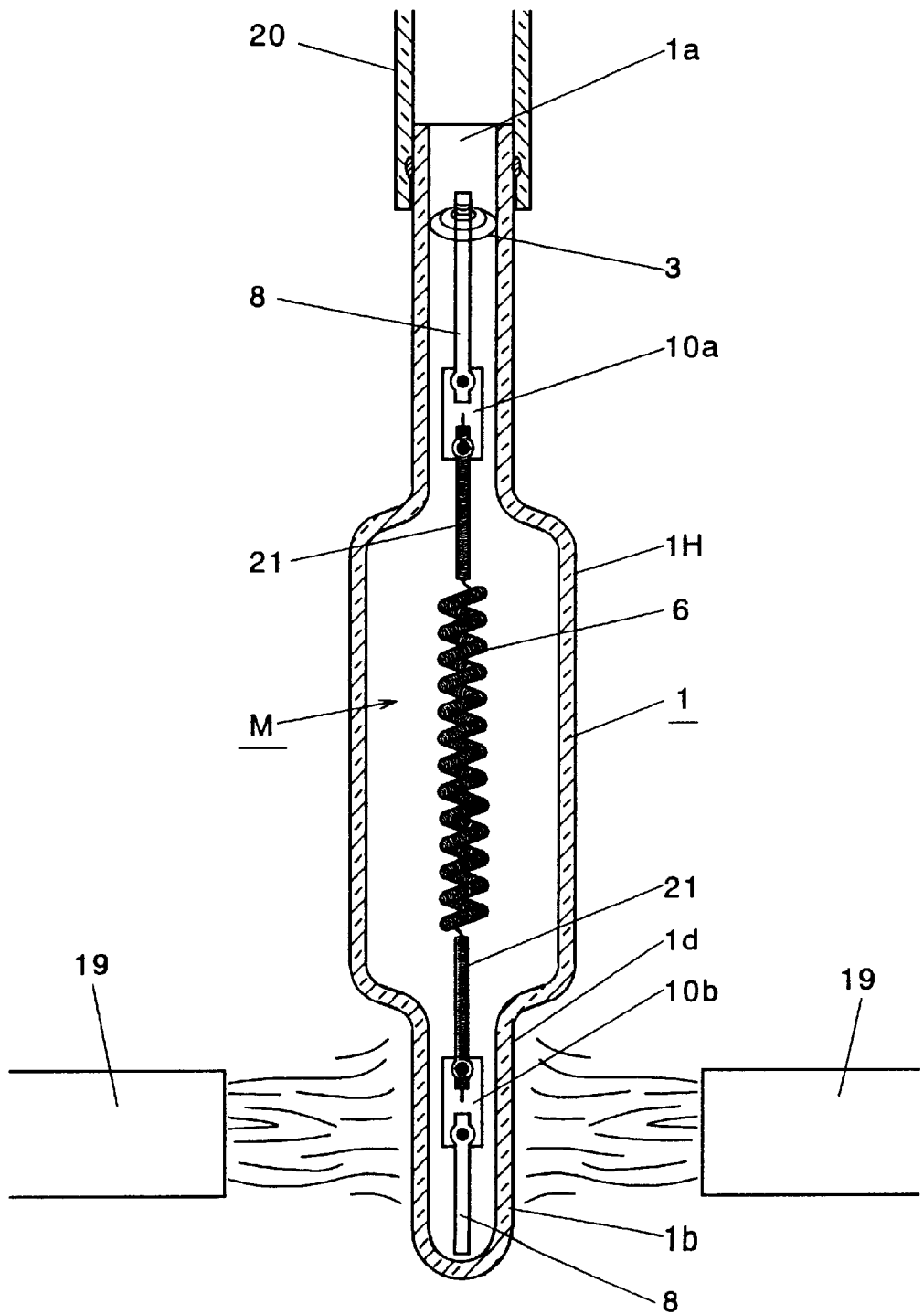
FIG. 1 is a partially-sectional elevational view illustrating one step of a method of sealing a halogen lamp according to the present invention in which a lamp envelop having an open end portion and a closed end portion is heated at the closed end portion.
Figure 2:
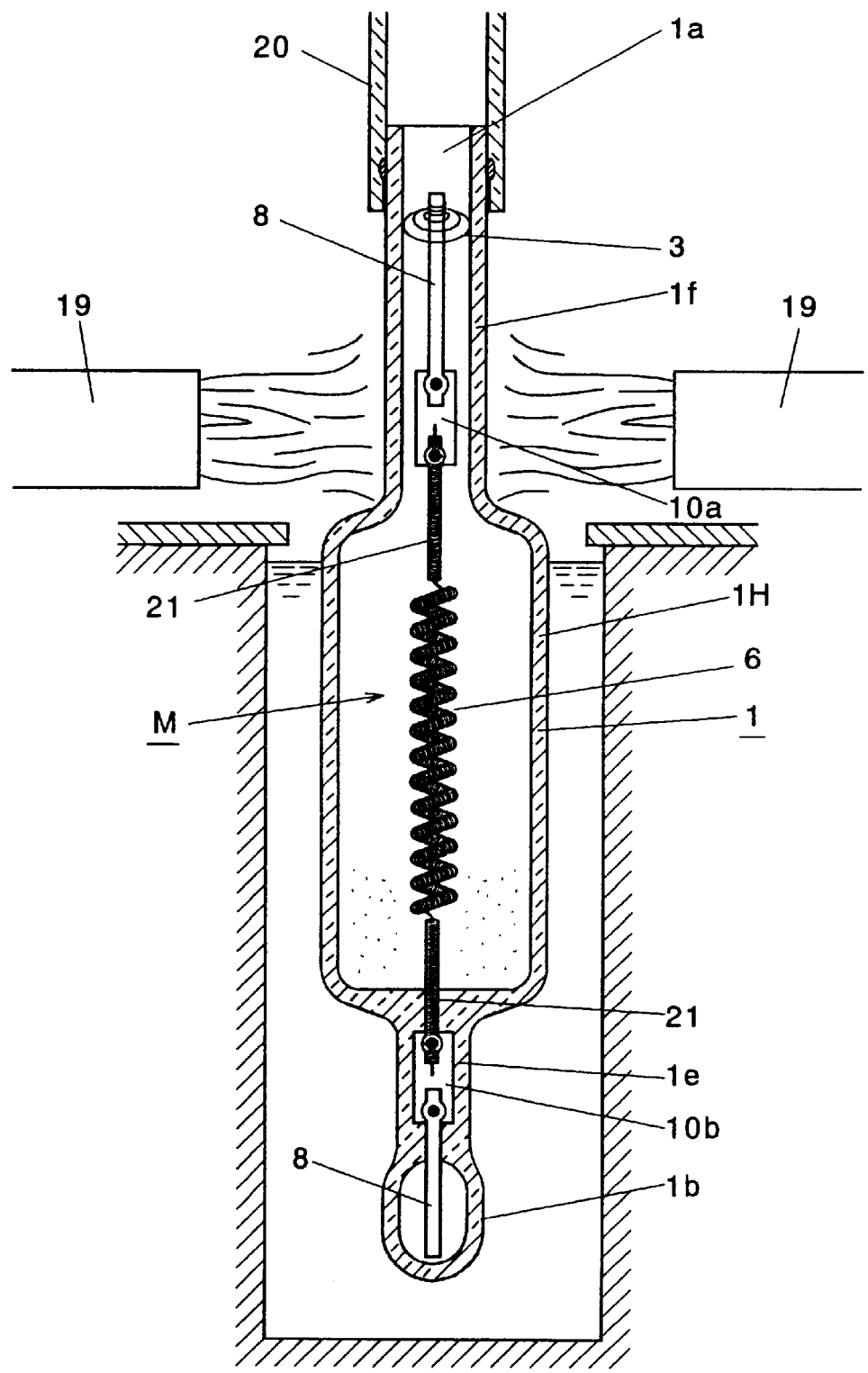
FIG. 2 is a partially-sectional elevational view illustrating one step of the method according to the present invention in which the lamp envelop shown in FIG. 1 is heated at the open end portion while being cooled at the lower side in liquid nitrogen.
Figure 6:
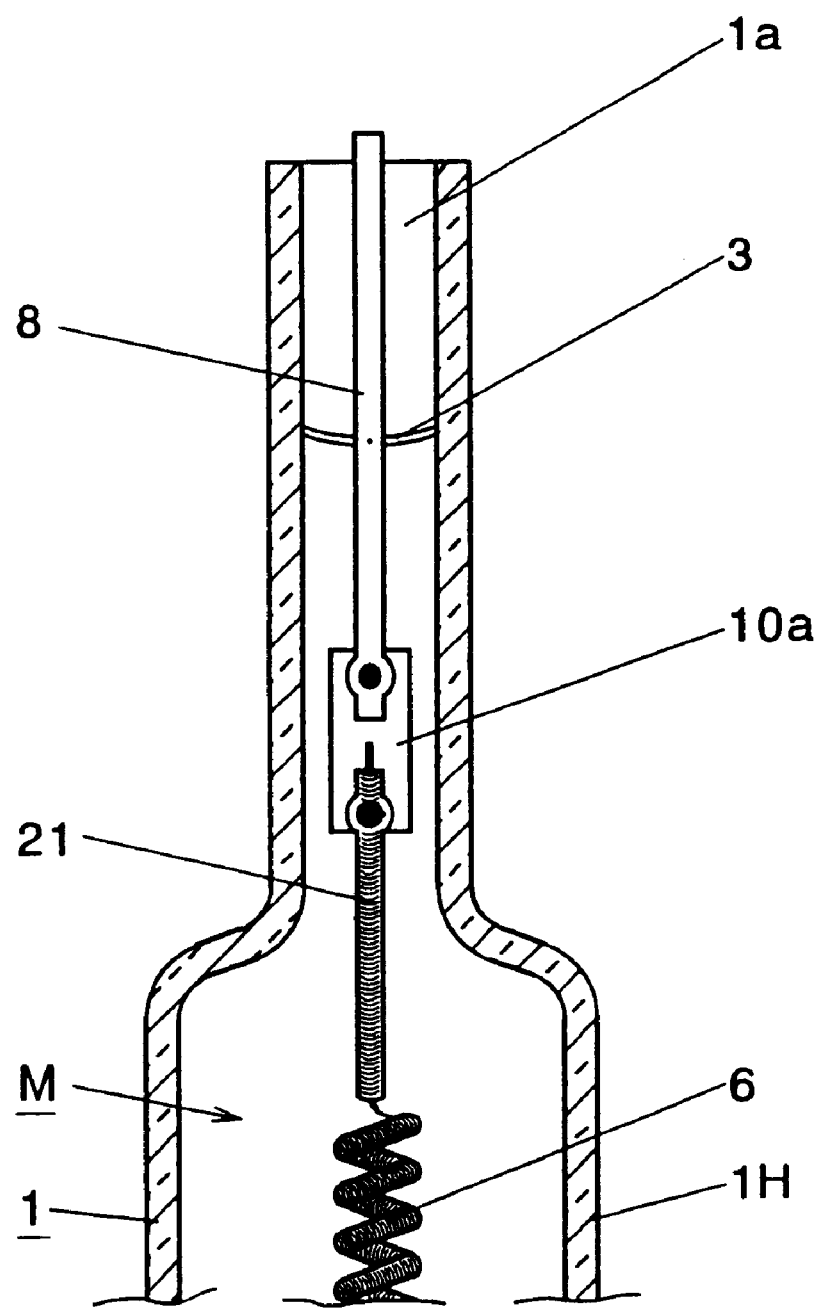
FIG. 6 is partially-sectional fragmentary elevational view illustrating one step of a method according to the present invention in which a resilient suspension member is formed of a thin wire.

The shape of resilient suspension member 3 is as follows. Separately provided resilient suspension member 3 may be formed by winding a thin metal wire into the form of vortex as shown in FIG. 1, or may comprise a resilient thin wire formed of, for example, stainless steel welded perpendicularly to outer lead pin 8 as shown in FIGS. 6 and 9. In any case, when inserted into the lamp envelop 1, the resilient suspension member 3 resiliently engages the inner circumferential surface of the lamp envelop 1 to suspend the mount M centrally of the lamp envelop 1.

FIG. 9 shows the case where open end portion 1a on the mount suspending side of lamp envelop 1 comprises a narrow portion 1a1 to be heated and softened which is narrower than envelop body 1H and a wide portion 1a2 contiguous to the narrow portion 1a1, and resilient suspension member 3 formed of a resilient thin wire of, for example, stainless steel resiliently engages the inner circumferential surface of the wide portion 1a2, thereby suspending the mount M centrally of the lamp envelop 1.

With this construction, when the narrow portion 1a1 is heated for sealing the open end portion on the suspending side, the existence of the wide portion 1a2 hinders flame of a burner from reaching gas supply tube 20, thereby protecting the gas supply tube 20 connected to the wide portion 1a2. As a result, the distance between the lower end of the gas supply tube 20 and the upper end of the envelop body 1H can be shortened, which leads to a saving of the material cost, hence, to a decreased cost of making a lamp. This construction is particularly effective where the lamp envelop 1 is formed of quartz glass because a strong thermal power of the burner is required to be applied to such a lamp envelop 1.

Shown in FIGS. 7 and 8 is the case where sealing foil 10a also serves as resilient suspension member 3. When inserted into open end portion 1a, the sealing foil 10a is wholly curved to resiliently engage the inner circumferential surface of the open end portion 1a, thereby suspending the mount M centrally of the lamp envelop 1. The leading end portion of the sealing foil 10a may be tapered for easier insertion into the open end portion 1a.

FIG. 14 shows the case where open end portion 1a is formed to have the same width as that of envelop body 1H, and resilient suspension member 3 is wound around corresponding outer lead pin 8 on the open end portion side so as to resiliently engage the inner circumferential surface of the lamp envelop 1. The resilient suspension member 3 is formed of a resilient thin wire having a vortex configuration.

Shown in FIG. 15 is the case where a portion of outer lead pin 8 is bent into a spiral configuration to serve as resilient suspension member 3. The shape and position of resilient suspension member 3 is not limited to those described above. That is, resilient suspension member 3 may be of any form which can suspend mount M within the lamp envelop 1, and may be attached to any position as well as to the outer lead pin 8.

FIGS. 11 to 13 show the relationship between closed end portion 1b of the lamp envelop 1 and the corresponding end of mount M. The end of the mount M is suspendedly positioned in the closed end portion 1b having a relatively large width as shown in FIG. 11, or in the closed end portion 1b formed narrower than envelop body 1H as shown in FIG. 12. Alternatively, the end of the mount M is suspendedly positioned within closed end portion 1b so that corresponding sealing foil 10b is located in narrow portion 1d to be heated and softened as shown in FIG. 13.

To be described next is a procedure of manufacturing the first embodiment of halogen lamp A1 in accordance with the present invention. With regard to variations of the first embodiment or other embodiments, only the points different from the first embodiment will be explained.

Firstly, lamp envelop 1 is provided comprising envelop body 1H, open end portion 1a and opposite closed end portion 1b, each end portion having a width smaller than that of the envelop body 1H as shown in FIG. 1. Then, mount M of the first form is inserted into the lamp envelop 1 from the open end.

As the mount M is inserted into the lamp envelop 1, resilient suspension member 3 resiliently engages the inner circumferential surface of the lamp envelop 1 to stop the mount M at an axially optimum position in the lamp envelop 1. In this state, lower outer lead pin 8 may abut against the bottom of the closed end portion 1b of the lamp envelop, or may be spaced therefrom. When the axial positioning of the mount M relative to the lamp envelop 1 is thus completed, gas supply tube 20 is connected to the open end portion 1a to exhaust air in the lamp envelop 1 to produce a substantial vacuum. (Alternatively, an inert gas may be filled into the lamp envelop to about 0.1 atm.) Then, a portion of the closed end portion 1b coinciding with lower sealing foil 10b is heated and softened. Since the inside of the lamp envelop 1 is kept in a substantial vacuum or in an inert gas atmosphere of about 0.1 atm, the sealing foil 10b is stably positioned centrally of the closed end portion 1b without being oxidized or fluttered, and further, the outer lead pin 8 is unlikely to be damaged by burning. To respond to a recent demand for halogen lamps of less power consumption, thinner outer lead pins are required as filaments become smaller and thinner. Although such a thin outer lead pin is likely to be damaged by burning, the method of the present invention prevents the thin outer lead pin from burning.

Since the inside of the lamp envelop 1 is in a substantial vacuum or a reduced pressure, the heated and softened portion 1d pressed by the atmospheric pressure shrinks to embrace the entire sealing foil 10b. After the sealing foil 10b is completely embraced, the softened portion may be subjected to a slight pinching to complete sealing, if necessary, and thus, the seal portion 13 is provided.

Subsequent to the sealing of the closed end portion 1b, a required gas is filled into the lamp envelop 1 from the open end portion 1a. Then, while cooling most portion of the lamp envelop 1 including the closed end portion 1b with liquid nitrogen if necessary, a portion of the open end portion 1a coinciding with the sealing foil 10a is heated and softened, and the heated portion 1f is sealed by natural shrinking or pinching to provide seal portion 13. After the opposite end portions are thus sealed, an unnecessary portion of at least the closed end portion 1b is cut away as required to provide a halogen lamp A1 shown in FIG. 3.

Figure 19:
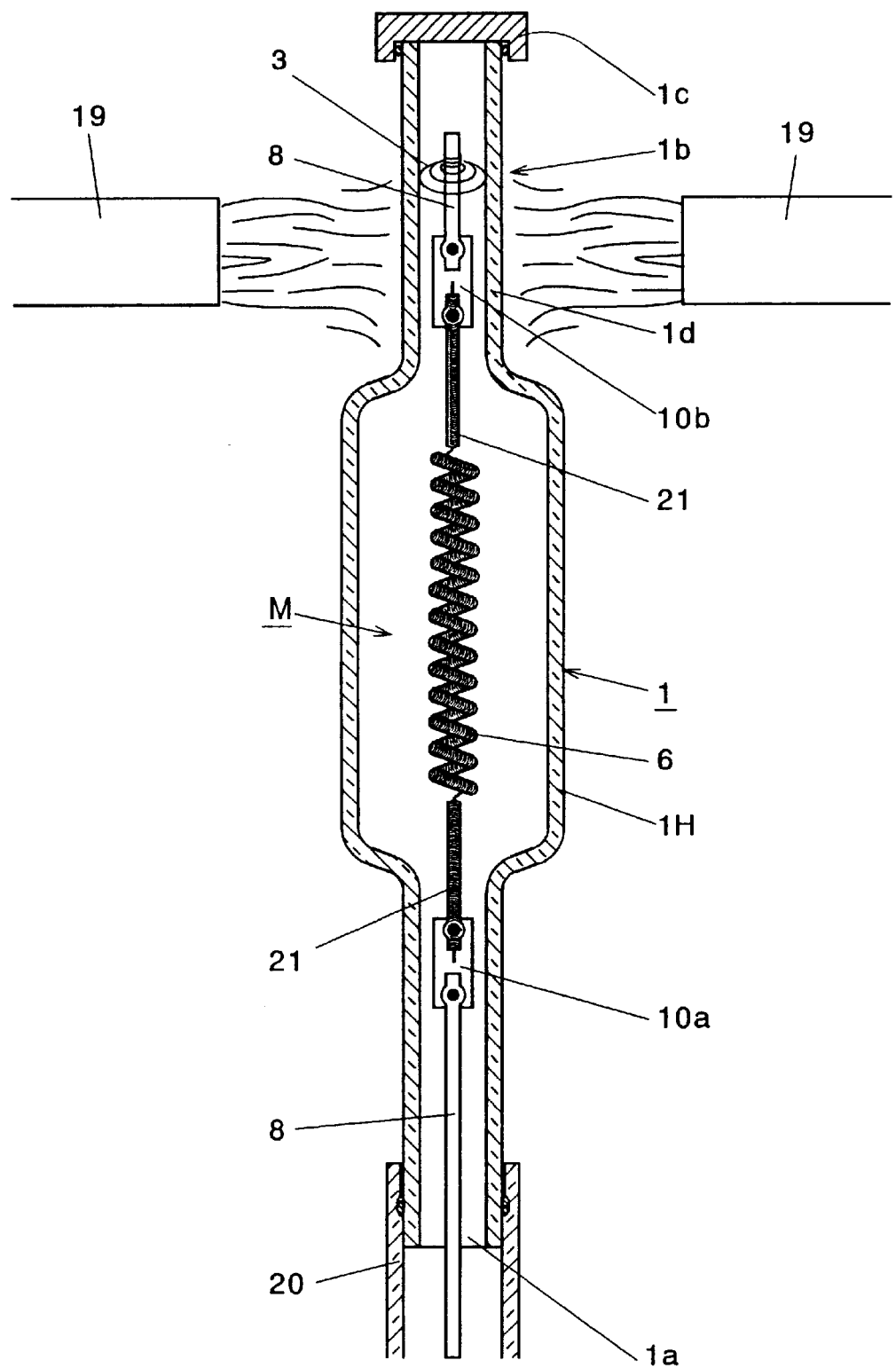
FIG. 19 is a partially-sectional elevational view illustrating one step of a method according to the present invention in which a lamp envelop has an upper open end portion closed with a sealing plug, and a resilient suspension member is positioned in the open end portion thus closed.

Shown in FIGS. 4 and 19 are examples each using lamp envelop 1 having opposite open end portions. In this case, mount M is inserted into the lamp envelop 1 so that resilient suspension member 3 is located within upper end portion, and then one end of the lamp envelop 1 is closed by fitting sealing plug 1c thereinto to provide closed end portion 1b. Alternatively, sealing plug 1c is fitted into one of the opposite open end portions to provide the closed end portion 1b before inserting the mount M into the lamp envelop 1. The subsequent steps are the same as those described above.

Figure 18:
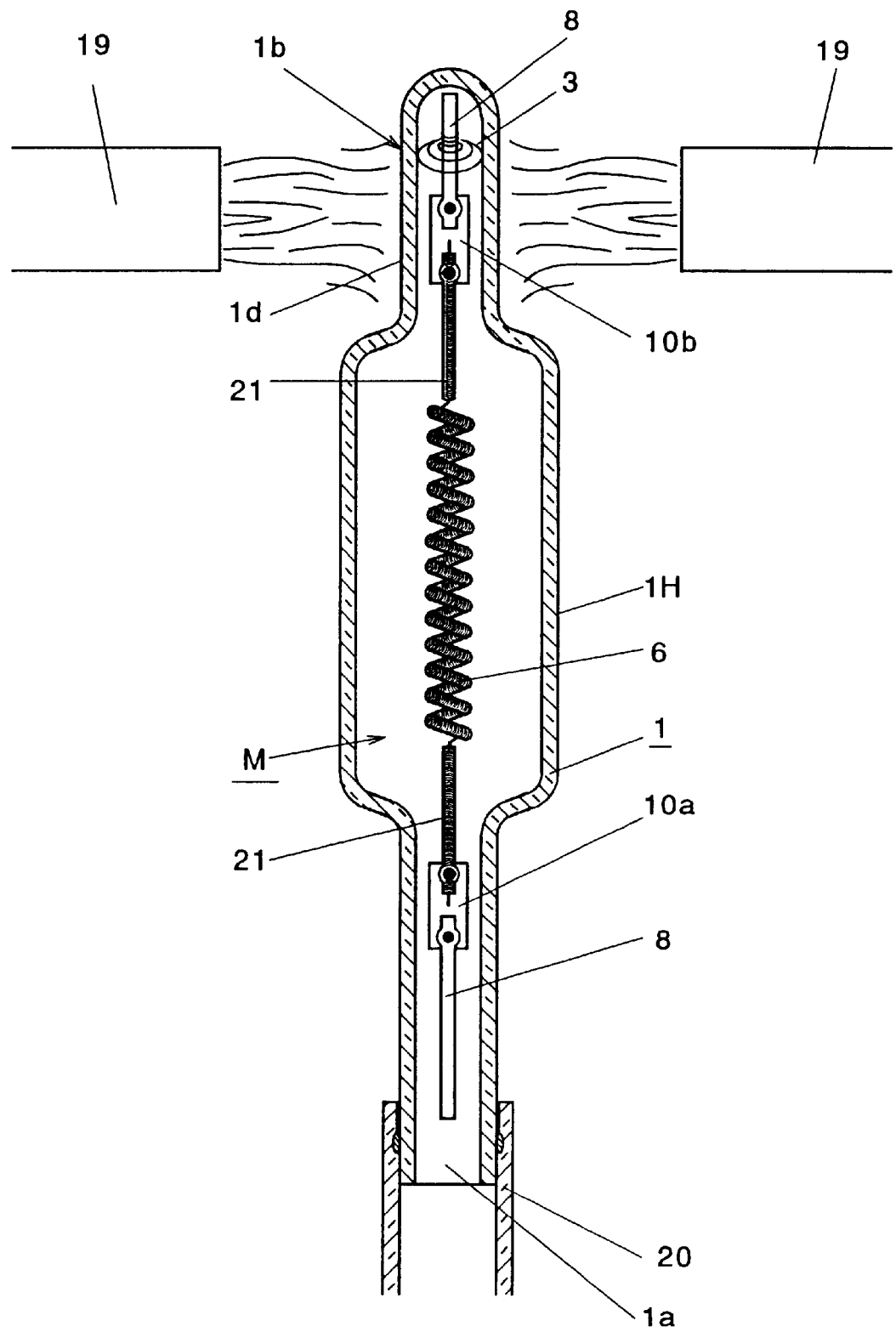
FIG. 18 is a partially-sectional elevational view illustrating one step of a method according to the present invention in which a lamp envelop has a closed end portion oriented upward in which a resilient suspension member is positioned.

Similarly to the FIG. 19 example, FIG. 18 illustrates an example where closed end portion 1b is oriented upward and resilient suspension member 3 is positioned therein.

Figure 5:
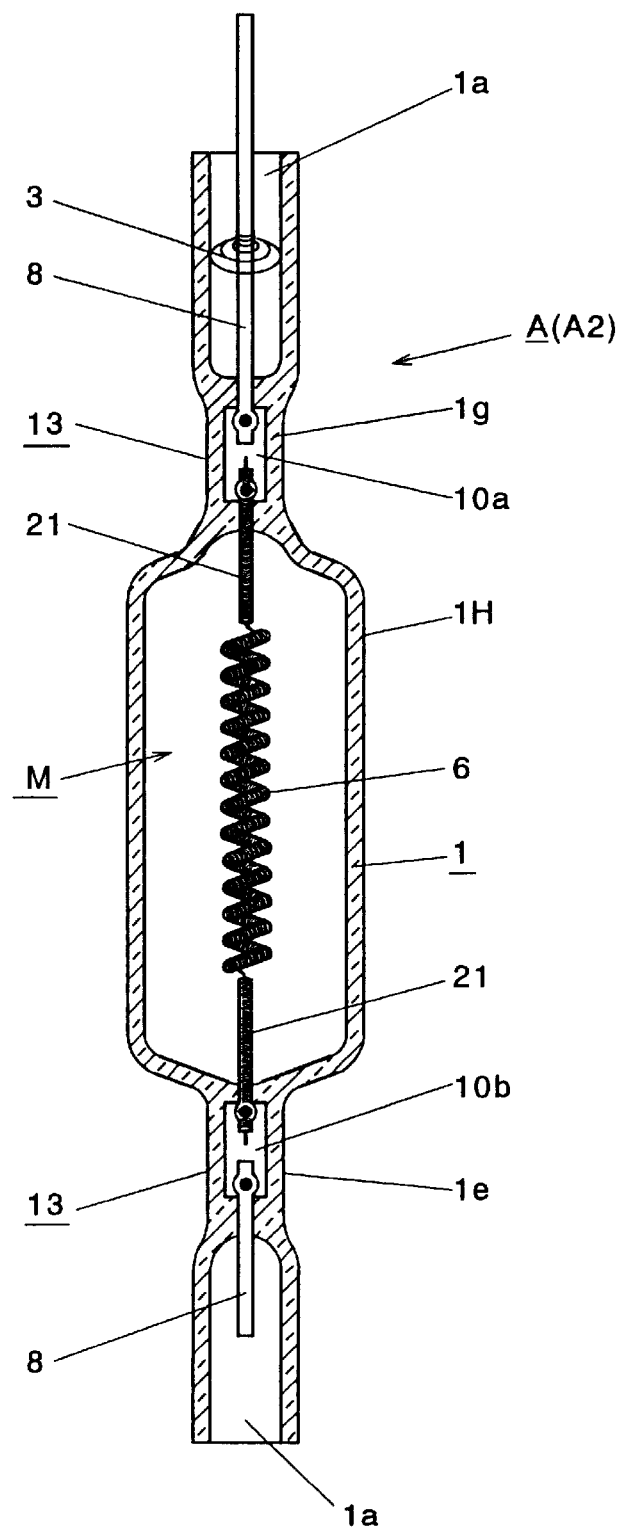
FIG. 5 is a partially-sectional elevational view illustrating a second embodiment of a double-ended type halogen lamp according to the present invention in a state where opposite ends of the lamp envelop shown in FIG. 4 are sealed.

Shown in FIG. 5 is a halogen lamp A2 formed using lamp envelop 1 of the type having opposite open end portions as described above. The halogen lamp A2 shown is in a state before cutting away unnecessary portions. The halogen lamp A2 may be used as it is or used after the unnecessary portions are cut away.

Figure 16:
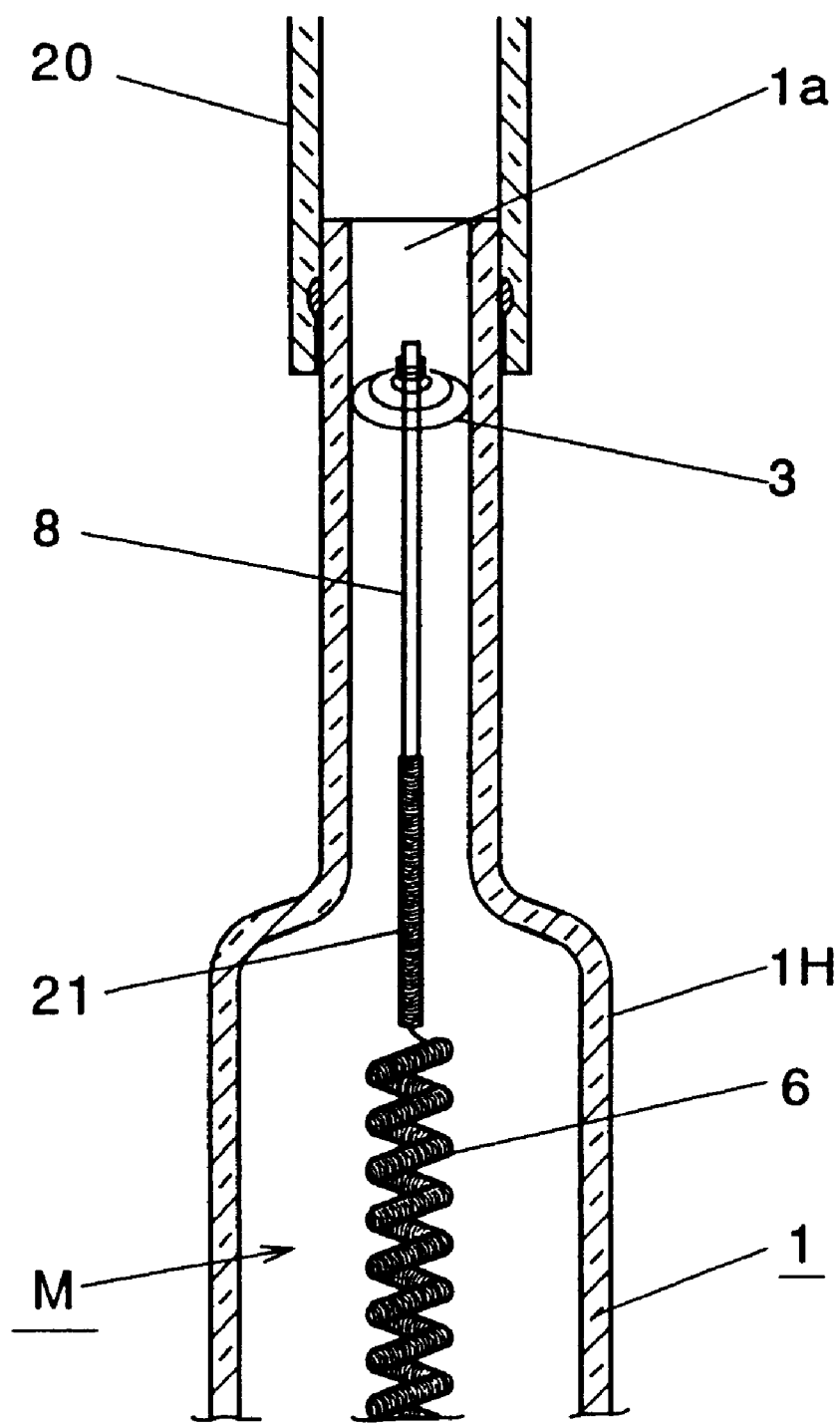
FIG. 16 is a partially-sectional fragmentary elevational view illustrating one step of a method according to the present invention in which a lamp envelop has an open end portion formed narrower than the envelop body, and a mount without a sealing foil is used.
Figure 17:
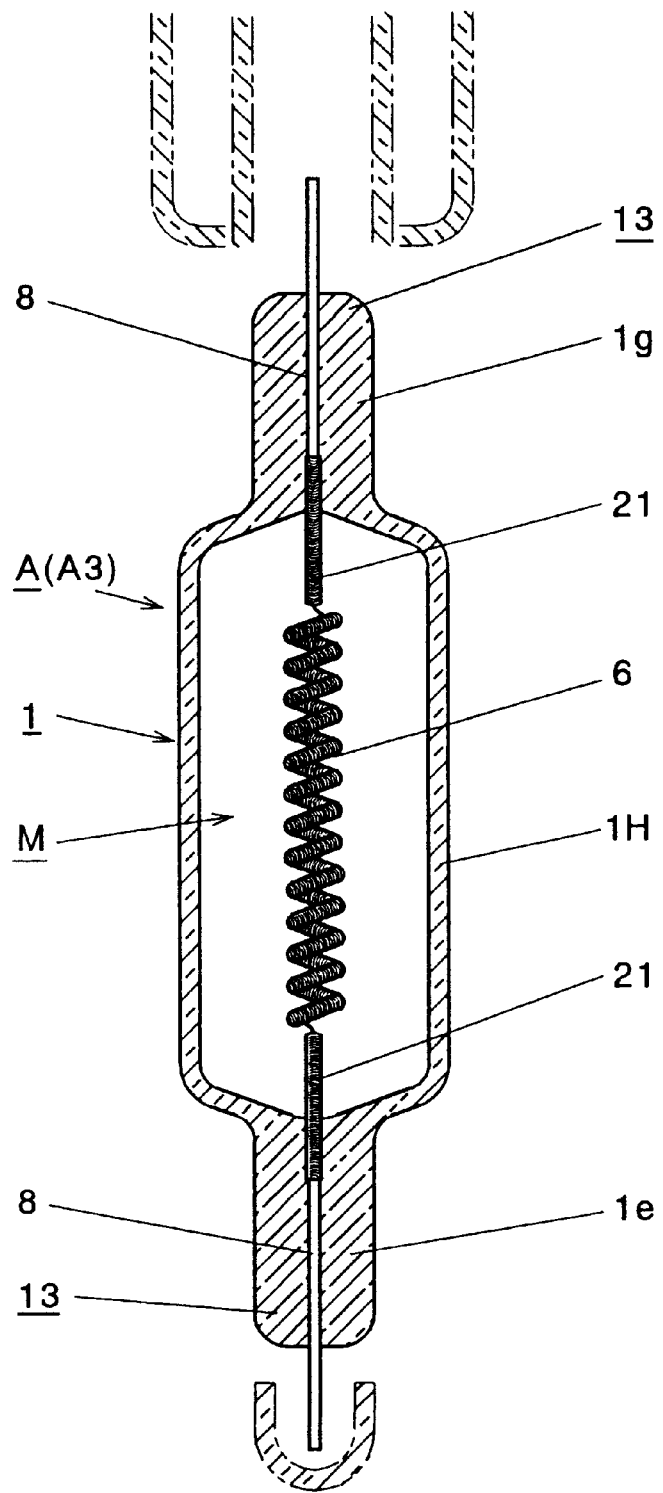
FIG. 17 is a partially-sectional elevational view illustrating a double-ended type halogen lamp in which a mount without a sealing foil is used.

FIGS. 16 and 17 show the case where sealing foils 10a and 10b are not used and opposite ends of filament 6 are each connected to outer lead pin 8 directly or through lead portion 21. This construction is suitable for a lamp envelop formed of hard glass. In this case, the shape and position of resilient suspension member 3 and the method of positioning the resilient suspension member 3 are the same as with the case where the mount M including the sealing foils 10a and 10b is used. Hence, the explanation thereof is omitted.

Where the lamp envelop 1 is formed of hard glass, the connecting portion between each outer lead pin 8 and the filament 6 or between each outer lead pin 8 and the corresponding outer lead portion 21 is typically embedded within each seal portion 13 as shown in FIG. 17. However, each outer lead pin 8 may be extended through the seal portion 13 to project into the envelop body 1H, or each lead portion 21 may be extended through the seal portion 13 to protrude outwardly therefrom.

Figure 20:
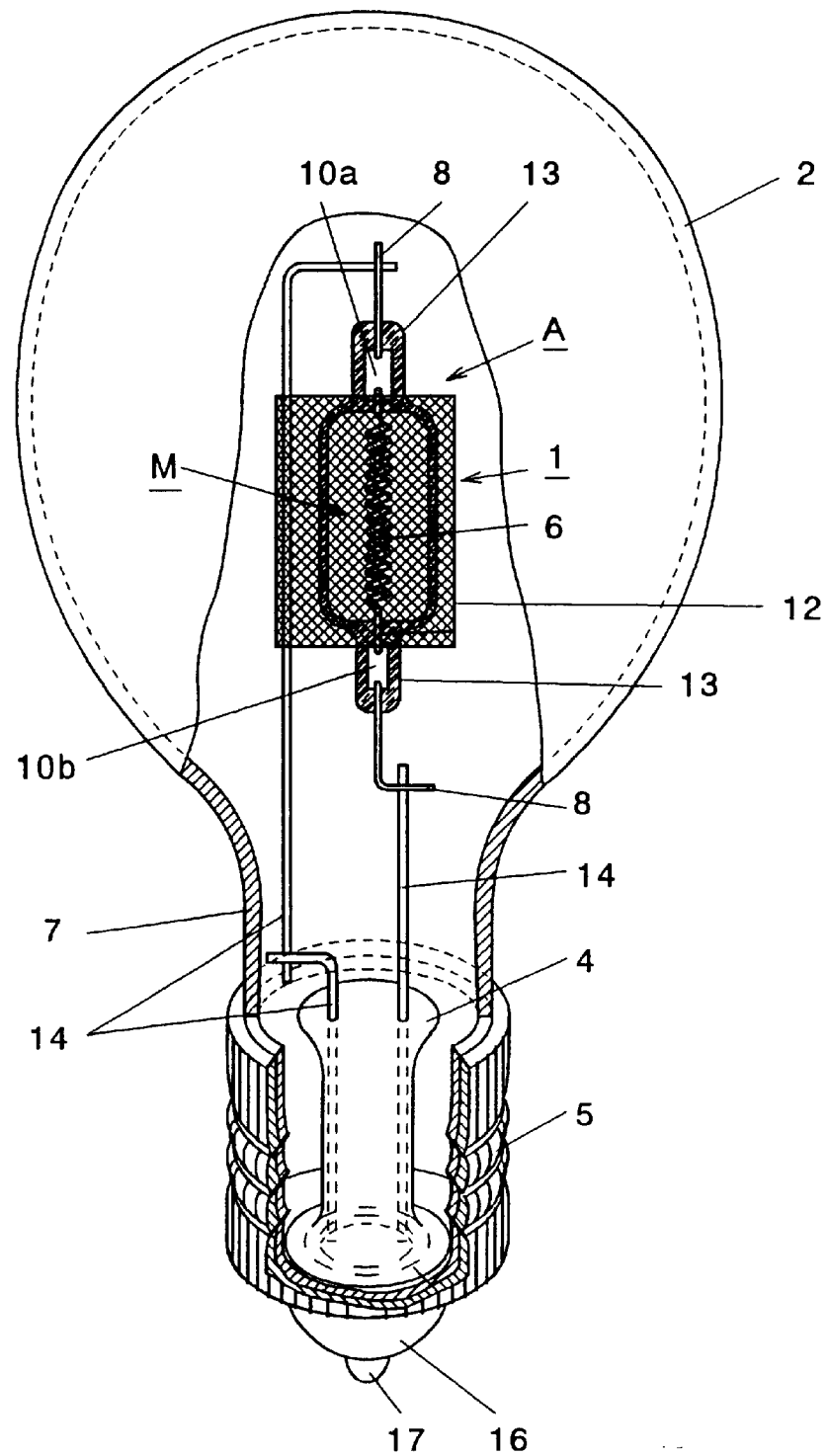
FIG. 20 is a partially cut away perspective view illustrating a halogen lamp housed in an egg-plant shaped outer bulb in accordance with the present invention.

Shown in FIG. 20 is halogen lamp A mounted vertically in an outer bulb 2 adaptable for typical incandescent lamps. A stem 4 is disposed within a lamp base insertion portion 7 of the outer bulb 2. To the outer surface of the lamp base insertion portion 7 is bonded a threaded lamp base 5 having the same size as that of a typical eggplant-shaped incandescent lamp. A central contact 17 disposed centrally of the threaded lamp base 5 through an insulator 16 is connected to one of stem-side lead pins 14 typically through an intermediate lead-in wire, and the other of the stem-side lead pins 14 is connected to the threaded lamp base 5 typically through an intermediate lead-in wire. With this construction, the halogen lamp can be connected directly to any typical socket for conventional eggplant-shaped incandescent bulbs.

The material of outer bulb 2 may be a glass or a resin, and may be transparent or translucent like ground glass. The state of the outer surface of the bulb can be selected as desired. Further, the outer bulb may assume various forms as well as a typical eggplant-shaped outer bulb.

The atmosphere within the outer bulb 2 is not limited to any particular one. That is, the inside of the outer bulb may be under inert atmosphere, or an increased or reduced pressure, or may be filled with air.

Further, an explosion resistant member 12 may be disposed to surround the halogen lamp A. The explosion resistant member 12 may be, for example, a cylindrical netting formed by knitting thin wires, or punched metal or a lath formed into a cylindrical configuration. The explosion resistant member 12 is directly or indirectly attached to one of the lead pins 14.

With this construction, the explosion resistant member 12 prevents fragments of the halogen lamp from scattering even when the halogen lamp serving as the inner bulb explodes by any reason, and hence, a secondary accident due to such explosion can be avoided.

Figure 21:
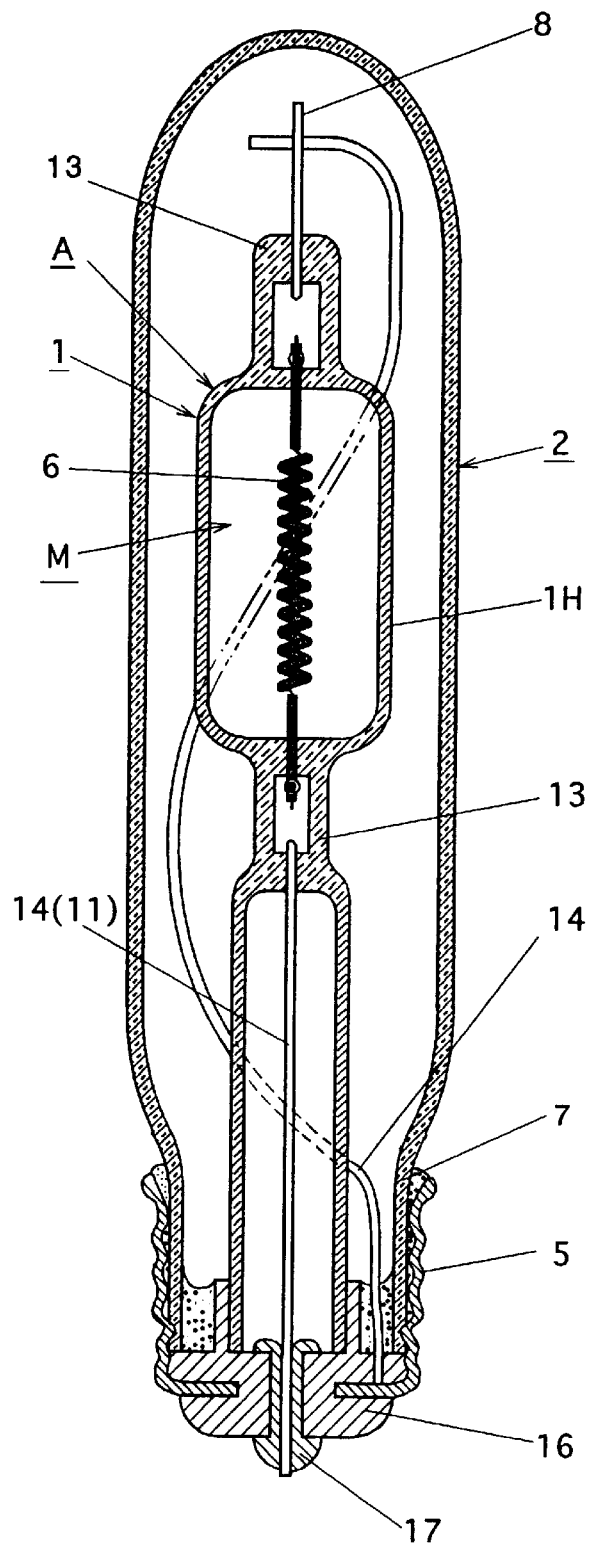
FIG. 21 is a partially-sectional elevational view illustrating a halogen lamp housed in an elongate outer bulb in accordance with the present invention.
Figure 22:
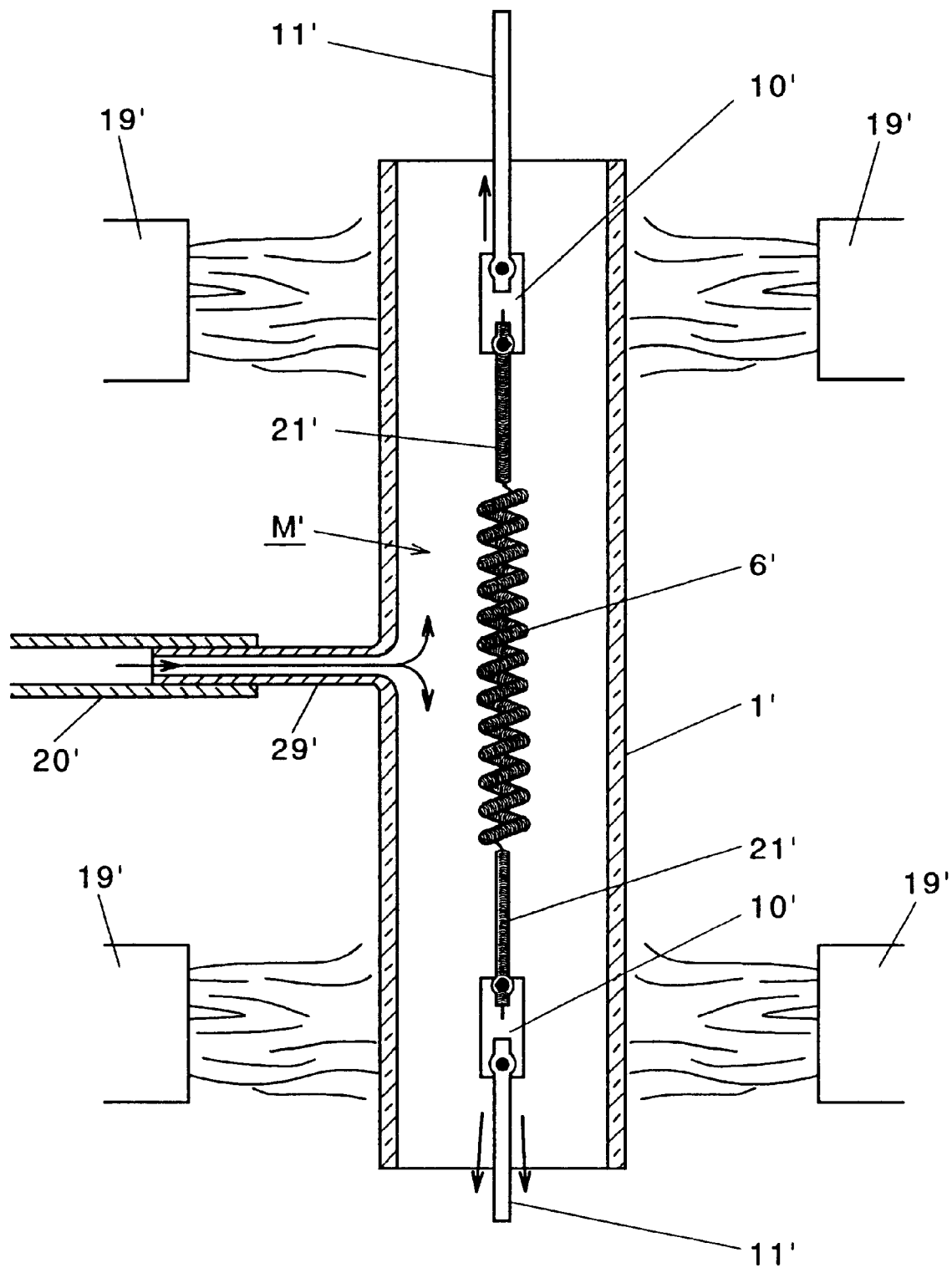
FIG. 22 is a partially-sectional elevational view illustrating one step of a conventional lamp envelop sealing process.
Figure 23:
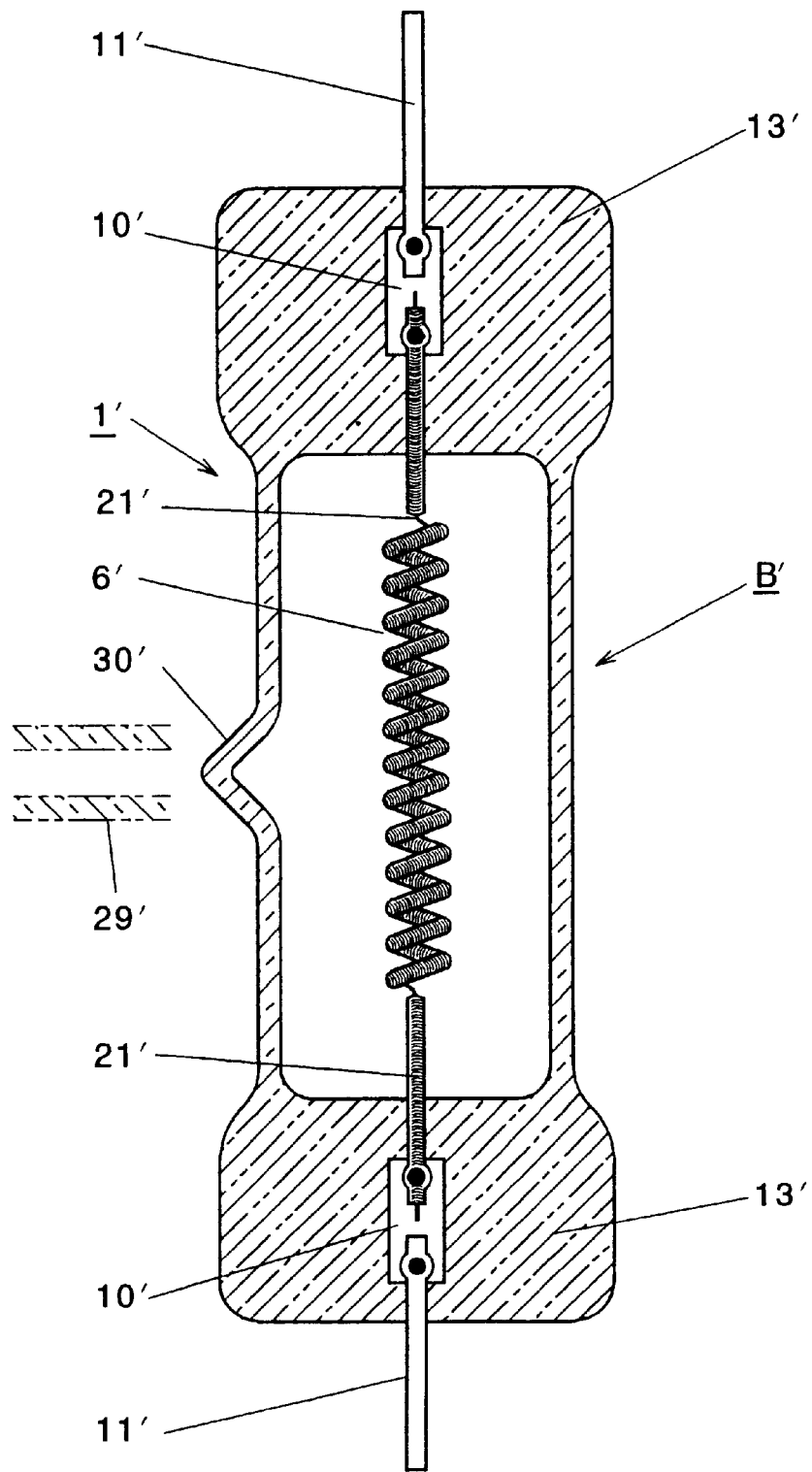
FIG. 23 is a partially-sectional elevational view illustrating a conventional halogen lamp.

FIG. 21 shows the case where the double ended type halogen lamp A shown in FIG. 5 is housed in an elongate outer bulb 2.

As has been described, the closed end portion of the lamp envelop (which may be formed by closing an open end with the sealing plug) is heated to shrink with the inside of the lamp envelop in a substantial vacuum state or in a reduced pressure of an inert gas in accordance with the present invention. Accordingly, breakage and oxidization of the sealing foils can be avoided and, one end of the mount can be assuredly embedded centrally of the shrunk portion of the closed end side. Further, good adhesion can be provided between one end of the mount and the shrunk portion, which enables the inside of the lamp envelop to be pressurized, resulting in a halogen lamp having a higher brightness and a longer life. In the case of the lamp envelop having an open end portion and a closed end portion both narrower than the envelop body, the mount can be easily positioned on the central axis of the lamp envelop just by inserting the mount into the lamp envelop. Further, the construction free of a cutting trace of a tip tube allows the filling gas pressure in the envelop body to increase thereby retarding the evaporation of tungsten forming the filament. Accordingly, it is possible to remarkably enhance the performance of halogen lamps. Of course, since the lamp envelop is free of the cutting trace of a tip tube, explosion of the lamp envelop, which would be conventionally caused by an internal strain due to such cutting trace, can be avoided. Accordingly, it is possible to considerably increase the filling gas pressure in the lamp envelop.

Where the open end portions of lamp envelop has a portion wider than the rest, the existence of the wide portion can hinder burner flame from reaching the gas supply tube. As a result, the gas supply tube can be protected, and the distance between the lower end of the gas supply tube and the upper end of the envelop body can be shortened, which leads to a decreased cost of making a lamp.

Further, by virtue of the provision of the resilient suspension member, the mount can be suspended at any desired position within the lamp envelop. That is, the resilient suspension member not only facilitates the axial positioning of the mount relative to the lamp envelop but also enables the compulsory positioning of one end of the mount on the central axis of the open end portion of the lamp envelop, whereby the mount can be substantially centered relative to the lamp envelop.

Furthermore, where the heated and softened portion of the closed end portion is subjected to pinch-sealing, the pinching operation in cooperation with the shrinking of the softened portion enhances the adhesion between the sealing foil and the seal portion of the lamp envelop.

While only certain presently preferred embodiments of the invention have been described in detail, as will be apparent with those skilled in the art, certain changes and modifications can be made in embodiments without departing from the spirit and scope of the invention as defined in the following claims.

What is claimed is:

1. A method of sealing a halogen lamp comprising the steps of:

providing a lamp envelop having an envelop body, an open end portion and a closed end portion;

inserting a mount including a filament into the lamp envelop through the open end portion thereof;

heating the closed end portion of the lamp envelop to soften and shrink thereby sealingly embedding one end of the mount in the closed end portion of the lamp envelop, while providing a reduced pressure in the lamp envelop;

filling the lamp envelop with a required gas; and heating the open end portion of the lamp envelop to soften and shrink thereby sealingly embedding the other end of the mount in the closed end portion of the lamp envelop;

wherein the open end portion of the lamp envelop comprises a narrow portion which is equal to or smaller in width than the envelop body, and a wide portion which is wider than the narrow portion, the narrow portion being intended to be heated to form a seal portion.

2. A method of sealing a halogen lamp comprising the steps of:

providing a lamp envelop having an envelop body, and first and second end portions which are open;

inserting a mount including a filament into the lamp envelop and closing the first end portion, or closing the first end portion and inserting the mount into the lamp envelop;

heating the first end portion thus closed of the lamp envelop to soften and shrink thereby sealingly embedding one end of the mount in the closed first end portion of the lamp envelop, while providing a reduced pressure in the lamp envelop;

filling the lamp envelop with a required gas; and heating the second end portion of the lamp envelop to soften and shrink thereby sealingly embedding the other end of the mount in the closed second end portion of the lamp envelop;

wherein the second end portion of the lamp envelop comprises a narrow portion which is equal to or smaller in width than the envelop body, and a wide portion which is wider than the narrow portion the narrow portion being intended to be heated to form a seal portion.

3. The method as set forth in claim 1, wherein: the mount is inserted into the lamp envelop in such a manner that the opposite ends of the mount are positioned in the open end portion and the closed end portion, respectively, of the lamp envelop.

4. The method as set forth in claim 2, wherein: the mount is inserted into the lamp envelop in such a manner that the opposite ends of the mount are positioned in the first and second end portions, respectively, of the lamp envelop.

5. The method as set forth in claim 1, wherein the mount has a resilient suspension member at any portion thereof, the resilient suspension member resiliently engaging any portion of the lamp envelop when inserted into the lamp envelop.

6. The method as set forth in claim 2, wherein the mount has a resilient suspension member at any portion thereof, the resilient suspension member resiliently engaging any portion of the lamp envelop when inserted into the lamp envelop.

7. The method as set forth in claim 1, wherein the step of heating the closed end portion of the lamp envelop further includes pinch-sealing a heated and softened portion of the closed end portion.

8. The method as set forth in claim 2, wherein the step of heating the first end portion of the lamp envelop further includes pinch-sealing a heated and softened portion of the closed end portion.

9. The method as set forth in claim 1, wherein the step of heating the open end portion of the lamp envelop further includes pinch-sealing a heated and softened portion of the open end portion.

10. The method as set forth in claim 2, wherein the step of heating the second end portion of the lamp envelop further includes pinch-sealing a heated and softened portion of the second end portion.

* * * * *